(12) United States Patent
Vienneau et al.

(10) Patent No.: US 7,427,988 B2
(45) Date of Patent: Sep. 23, 2008

(54) METHOD AND APPARATUS FOR DEFINING AND DISTRIBUTING AN ANIMATION

(75) Inventors: Christopher Vienneau, Montreal (CA); Amit Parghi, Montreal (CA)

(73) Assignee: Autodesk Canada Co., Montreal, Quebec (CA)

( * ) Notice: Subject to any disclaimer, the term of this patent is extended or adjusted under 35 U.S.C. 154(b) by 1120 days.

(21) Appl. No.: 10/079,322

(22) Filed: Feb. 20, 2002

(65) Prior Publication Data
US 2002/0157105 A1 Oct. 24, 2002

(30) Foreign Application Priority Data
Apr. 20, 2001 (GB) ................. 0109752.6

(51) Int. Cl.
*G06T 13/00* (2006.01)
*H04N 7/10* (2006.01)
*H04N 5/222* (2006.01)
*G06F 3/00* (2006.01)

(52) U.S. Cl. .................. 345/473; 725/32; 348/722; 715/743

(58) Field of Classification Search ................. 725/140, 725/105, 40, 32, 36; 345/473; 348/722; 715/743
See application file for complete search history.

(56) References Cited

U.S. PATENT DOCUMENTS

| 5,457,491 | A | * | 10/1995 | Mowry .................. 348/104 |
| 5,467,397 | A | * | 11/1995 | West et al. .............. 380/209 |
| 5,655,067 | A | * | 8/1997 | Takahashi et al. ......... 345/473 |
| 5,708,845 | A | * | 1/1998 | Wistendahl et al. ...... 715/500.1 |
| 5,809,204 | A | * | 9/1998 | Young et al. .............. 386/83 |
| 5,940,073 | A | * | 8/1999 | Klosterman et al. ........ 715/721 |
| 5,953,506 | A | * | 9/1999 | Kalra et al. .............. 709/231 |
| 6,057,847 | A | * | 5/2000 | Jenkins .................. 345/422 |
| 6,111,614 | A | * | 8/2000 | Mugura et al. ............ 348/569 |
| 6,154,203 | A | * | 11/2000 | Yuen et al. .............. 725/52 |
| 6,173,439 | B1 | * | 1/2001 | Carlson et al. ............ 717/108 |
| 6,314,569 | B1 | * | 11/2001 | Chernock et al. .......... 725/37 |
| 6,330,610 | B1 | * | 12/2001 | Docter et al. ............. 709/229 |
| 2001/0003212 | A1 | * | 6/2001 | Marler et al. ............. 725/40 |
| 2001/0024239 | A1 | * | 9/2001 | Feder et al. ............. 348/423.1 |
| 2001/0037500 | A1 | * | 11/2001 | Reynolds et al. .......... 725/36 |
| 2002/0010928 | A1 | * | 1/2002 | Sahota .................... 725/40 |

(Continued)

FOREIGN PATENT DOCUMENTS

EP 1037167 A2 * 9/2000

(Continued)

*Primary Examiner*—Hoang-Vu A Nguyen-Ba
(74) *Attorney, Agent, or Firm*—Gates & Cooper LLP

(57) ABSTRACT

A method of customising an animation. A broadcast station renders first animated objects in response to locked graphic data and unlocked metadata. The metadata facilitates customisation, by including parameter interface information as well as actual parameter values, so that the first animation objects can be customised without reference to the locked graphic data. A distribution station receives signals from the broadcaster, and cumulatively renders second animated objects in response to second locked graphic data and second unlocked metadata, the latter of which is modified in response to distributor data. A television receives signals from the distributor, and cumulatively renders third animated objects in response to third locked graphic data and third unlocked metadata, which is modified in response to viewer data.

11 Claims, 40 Drawing Sheets

U.S. PATENT DOCUMENTS

2005/0166224 A1 * 7/2005 Ficco .......................... 725/35
2005/0251827 A1 * 11/2005 Ellis et al. ..................... 725/47

FOREIGN PATENT DOCUMENTS

| | | | |
|---|---|---|---|
| EP | 1037167 | A2 | 9/2000 |
| EP | 1047240 | A2 | 10/2000 |
| EP | 1047240 | A2 * | 10/2000 |
| WO | WO 99/26415 | * | 5/1999 |

* cited by examiner

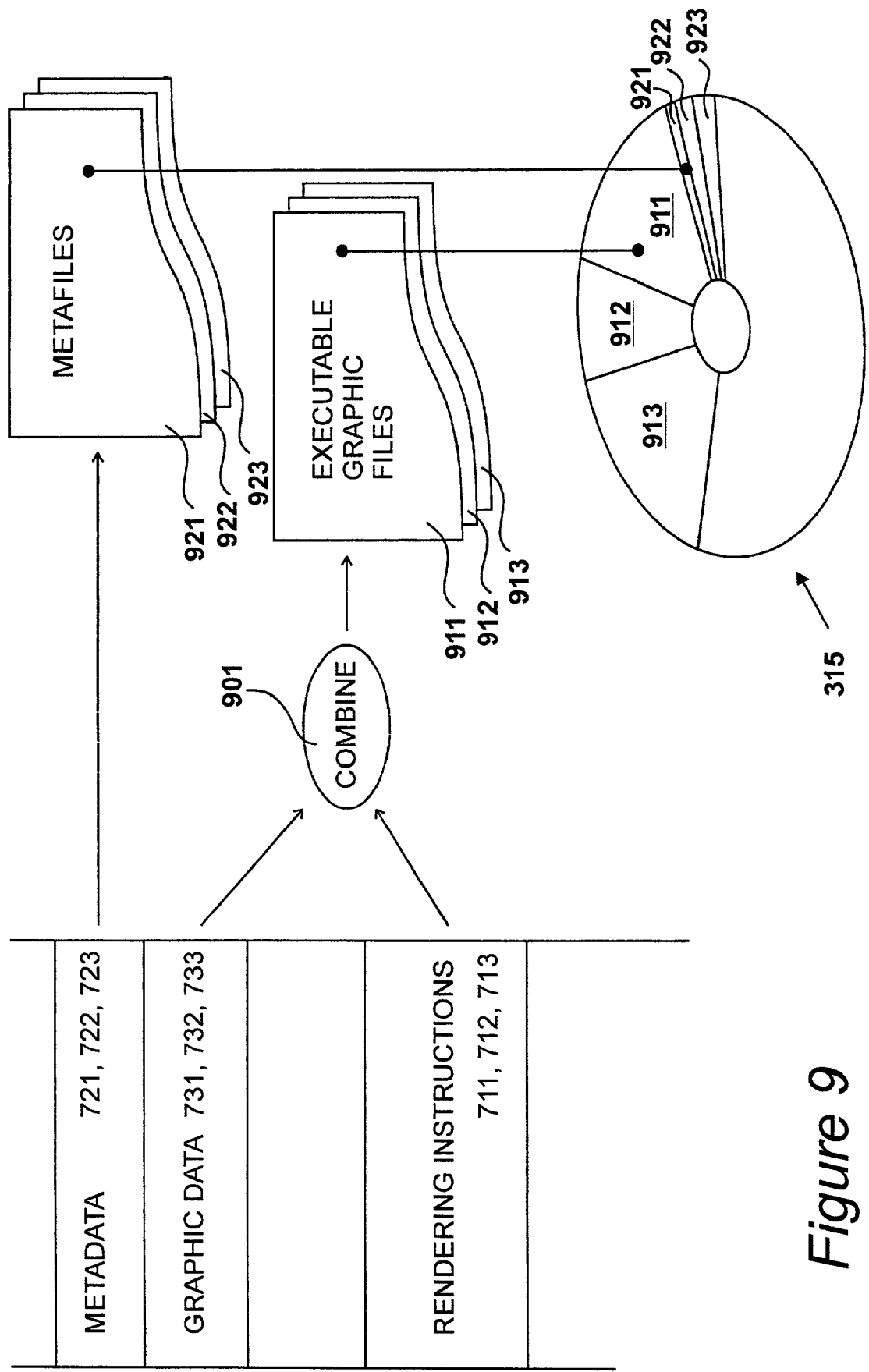

```
1001  <?xml version="1.0" encoding="iso-8859-1"?>
1002  <!DOCTYPE page SYSTEM "dlPage.dtd">
1003
1004  <page name="Julie" projectName="Unknown" graphicName="dave_scene"
1005  date="13 novembre" description="Juju standalone" userId="castond">
1006    <pageEntry referenceID="14">
1007      <value data="9.0">
1008        <type name="float" default="2.0">
1009          <max>3.40282e+038</max>
1010          <min>-3.40282e+038</min>
1011        </type>
1012      </value>
1013      <description>election2_pies:certain</description>
1014    </pageEntry>
1015    <pageEntry referenceID="15">
1016      <value data="2.4">
1017        <type name="float" default="3.0">
1018          <max>3.40282e+037</max>
1019          <min>-3.40282e+037</min>
1020        </type>
1021      </value>
1022      <description>election2_pies:undecided</description>
1023    </pageEntry>
```

*Figure 10*

```
1024    <pageEntry referenceID="184">
1025        <value data="Localtown">
1026            <type name= "string" default="">
1027                <maxLength>31</maxLength>
1028                <invChars> . {}"</invChars>
1029            </type>
1030        </value>
1031        <description>election2_pies:name</description>
1032    </pageEntry>
1033    <pageEntry referenceID="134">
1034        <value data="vtx_exp">
1035            <type name="enum" default="vtx_lin">
1036                <pValue>vtx_lin</pValue>
1037                <pValue>vtx_exp</pValue>
1038                <pValue>vtx_exp2</pValue>
1039                <pValue>pix_lin</pValue>
1040                <pValue>pix_exp</pValue>
1041                <pValue>pix_exp2</pValue>
1042            </type>
1043        </value>
1044        <description>election2_pies:type</description>
1045    </pageEntry>
1046 
```

*Figure 11*

METHOD AND APPARATUS FOR DEFINING AND DISTRIBUTING AN ANIMATION

BACKGROUND OF THE INVENTION

1. Field of the Invention

The present invention relates to generating animations for distribution, and in particular relates to customising animations distributed to multiple viewers.

2. Description of the Related Art

Animations are used widely in television broadcasting. For example, in an election broadcast, statistics can be presented in a way to enhance the communication of complex information to viewers. Such animations are usually generated digitally, relying on digital systems to render the information graphically, and often receiving new data from an on-line database. Several graphics can be sequenced in time in what is referred to as a rundown, and the corresponding animation sequences may be cued manually or automatically in a studio automation system.

The design of such animations is a complex and time intensive process. All the objects of an animation are defined as combinations of primitive geometric shapes, such as cubes, spheres and so on. Surface textures, text fonts, and three-dimensional views, are all coordinated by the graphic designer to create the best possible effect. Animations often comprise multiple moving objects, so as to provide a more exciting visual appearance. In order to achieve this, the designer must define the motion, as well as the appearance, of all moving objects contained in the animation. This can take considerable effort. As the capabilities of animation processing systems increase, the possibilities for detail and visual richness put additional pressure on the designer to make use of these facilities.

The financial cost of this design effort requires that animations, or their components, be re-used whenever possible. Known animation systems allow customisation by provision of an Application Programming Interface (API). Using the API, an animation can be modified by a computer program written to interface with a specific animation. The complexity of modifying an animation is minimised by the creation of such custom interfaces, thereby enabling journalists, TV program producers, and so on, to interact with and modify an animation through a simplified interface that can be presented on a conventional computer terminal.

The creation of such custom-written software also requires a lot of effort. Both levels of design require highly skilled personnel. The known animation design process is therefore split into two expensive procedures, and extra effort is often expended to overcome difficulties created by the fact that such complex design processes are often being carried out by different teams of people.

As a result of these considerations, custom animations are only used extensively in high budget television broadcasts. The possibility to further customise an animation in response to the differing requirements of cable distributors for a particular program, is overlooked, due to the fact that most such programs are distributed live, and, in any case, the complexity of customisation using known tools, puts this possibility beyond the reach of local cable television stations.

BRIEF SUMMARY OF THE INVENTION

According to an aspect of the present invention there is provided an image data distribution system comprising a first station and a second station, in which an animation comprises first animated objects and second animated objects separate to said first animated objects, wherein said animation is defined by first data defining characteristics of said first animated objects and second data including modifiable parameters defining specified characteristics of said second animated objects, and said second station includes receiving means arranged to receive said first data and said second data from said first station, and processing means arranged to modify said modifiable parameters only, such that when said animation is displayed, said second animated objects display additional information.

In a preferred embodiment, the second data includes locked parameters, defining first characteristics of the second objects, accessible at a first level of user access only, and unlocked parameters defining the specified characteristics accessible at a second level of user access. Preferably, the locked parameters are accessible at a first level of user access, before the locked parameters are scrambled to prevent access at the second level of user access.

Preferably, the first animated objects are generated by execution of rendering instructions upon processing means located at said first station and said second animated objects are generated by execution of rendering instructions upon said processing means located at said second station.

BRIEF DESCRIPTION OF THE SEVERAL VIEWS OF THE DRAWINGS

FIG. 9 details the step of transferring data shown in FIG. 4;

FIGS. 10 and 11 detail the metadata shown in FIG. 7;

BEST MODE FOR CARRYING OUT THE INVENTION

Figure 1:
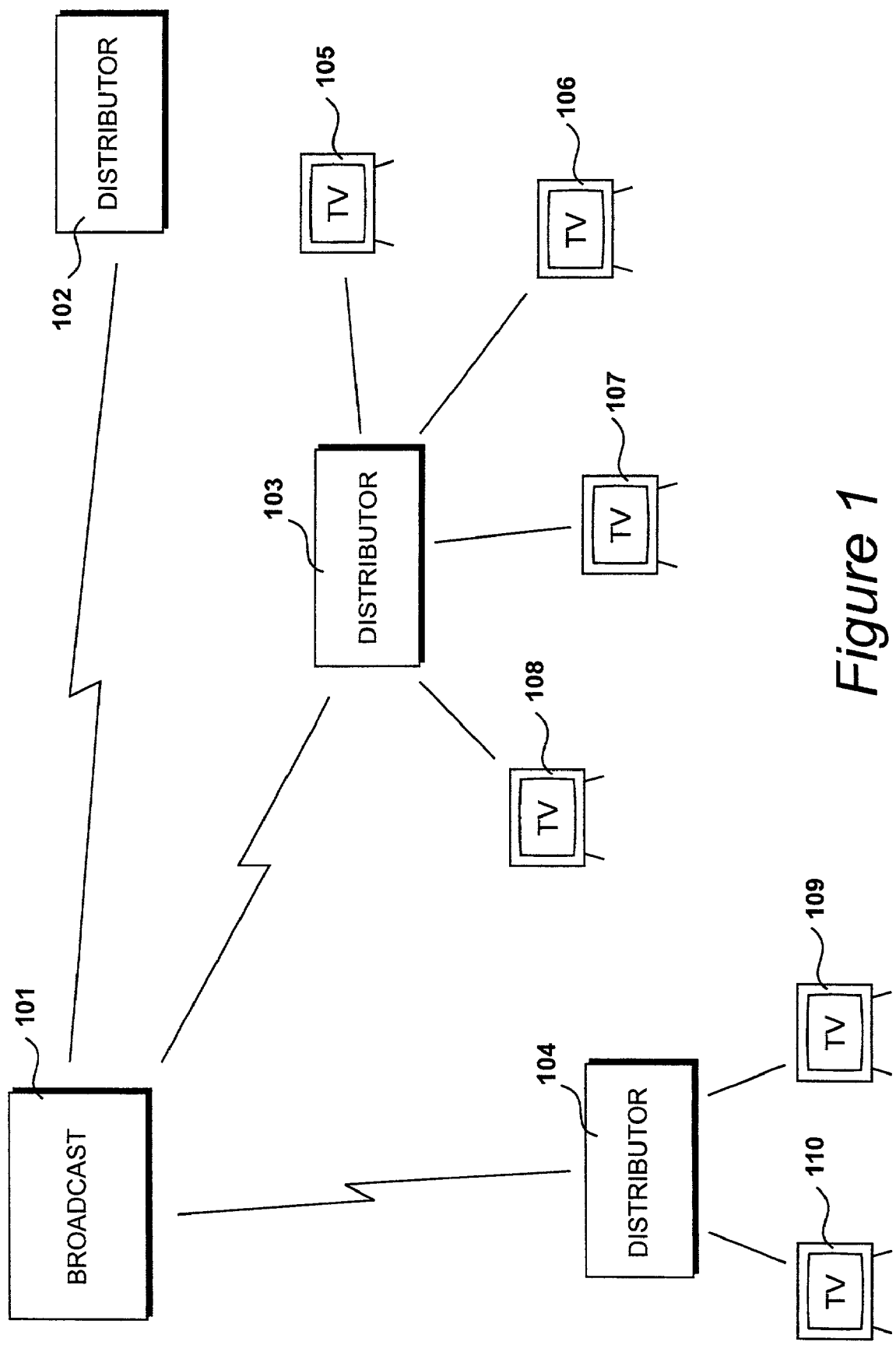
FIG. 1 shows a television broadcast network, including a broadcaster, a distributing station and a viewer's receiver.

A system for the broadcast of television programs is shown in FIG. 1. A broadcast station 101 transmits signals by satellite to several content distribution stations 104. Typically these receive the television signals from one or several broadcasters 101 and redistribute them on a local cable network to customer television sets 105 to 110. Each distributor customises the mix of programs available according to local requirements. Some distributors may provide self-made program material, but in general, a large quantity of program time will originate at a broadcaster such as the broadcast station 101. Furthermore, each individual viewer will have different personal interests, which cannot be fully satisfied by program content from either the broadcaster 101 or the local distributor 103, due to the fact that both these entities must provide program material that suites a wide range of tastes and interests.

The broadcaster 101 shown in FIG. 1, in practice includes many organisational entities, including those that may exist in geographically separate locations. The broadcast station may be a predominantly news-based content supplier. In news broadcasting, as well as many other kinds of broadcasting, graphics are very often used to enhance the display of factual information. In its simplest form, these include subtitles, but most broadcasters have facilities for generating complex animations, in which text, shapes, and entire virtual environments can be caused to change over time, either in a predetermined way, or in response to real time information, such as information about a camera angle, or live data received during an election broadcast, for example. Increasingly, animations are considered an essential part of high quality broadcasting.

Animation design is typically the responsibility of the broadcaster 101. The broadcaster 101 includes organisational facilities for generating and broadcasting animations, and these are detailed in FIG. 2.

Animations are initially created in an animation design house 201. The animations are designed for a specific purpose, for example, the enhancement of a television news program, in which news information is additionally presented in the form of graphical animations. An animation design, also known as a graphic, once complete, can be transferred via the Internet 202 to a newsroom 203. Alternative modes of transfer for the animation include physical transfer via CDROM, and local area networks that include both the newsroom 203 and the animation design house 201.

The newsroom 203 updates the graphic with current news data, and supplies these to a TV studio 204, where this information is integrated within the context of a news program for broadcast via a broadcast transmitter 205. Journalists using personal computers 206 and 207 may supply news data to the newsroom 203, by a modem connection to an Internet service provider (ISP) 209 which provides connectivity to the Internet 202. Connection between the newsroom 203 and the TV Studio is also made over the Internet. A microwave link 210 facilitates transfer of live audio and video broadcast signals from the TV studio 204 to the broadcast transmitter 205.

Figure 2:
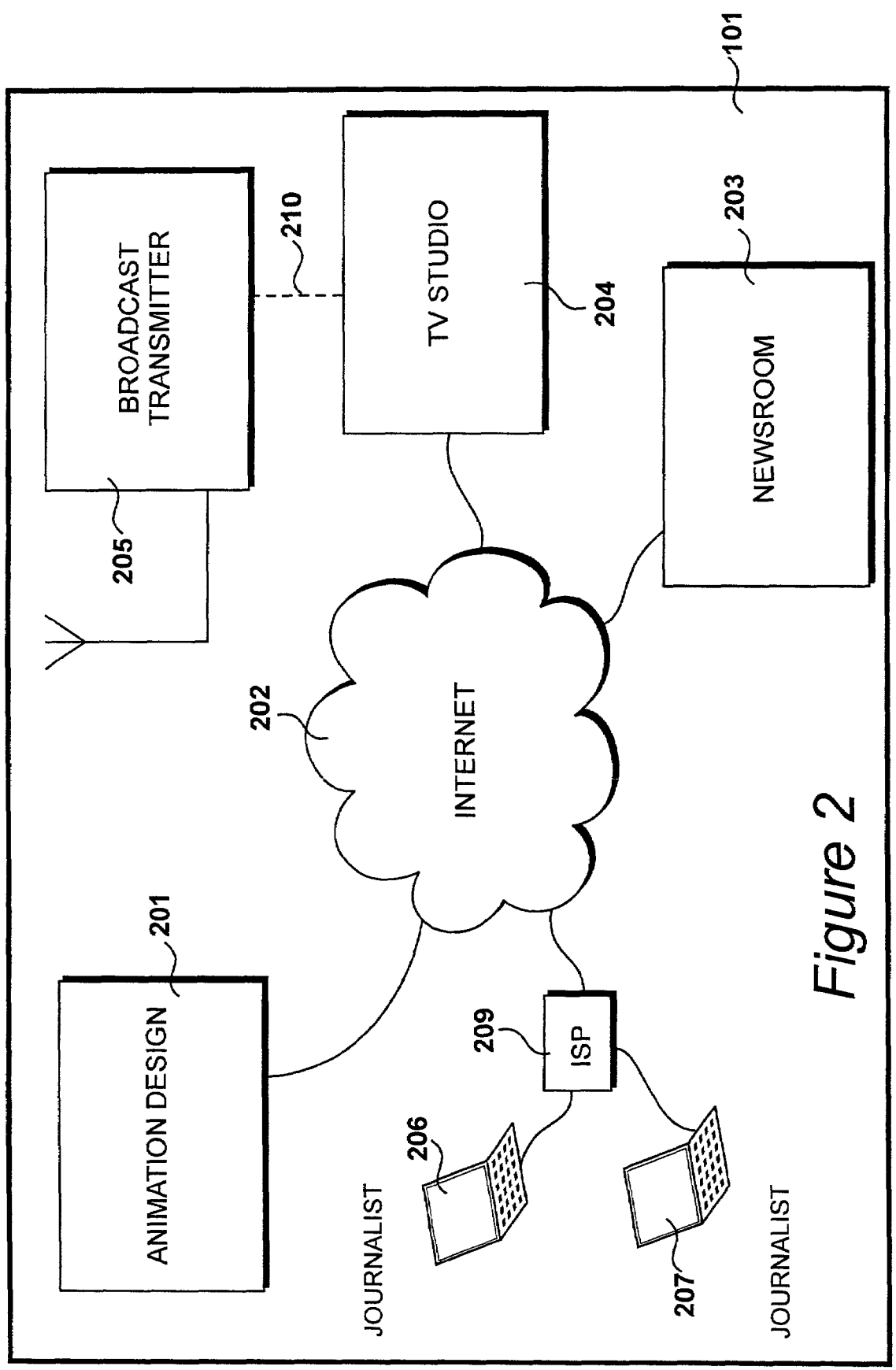
FIG. 2 details the broadcaster shown in FIG. 1, showing a number of geographically separated sites across which animation data is shared, including an animation design house, a newsroom and a television studio.
Figure 3:
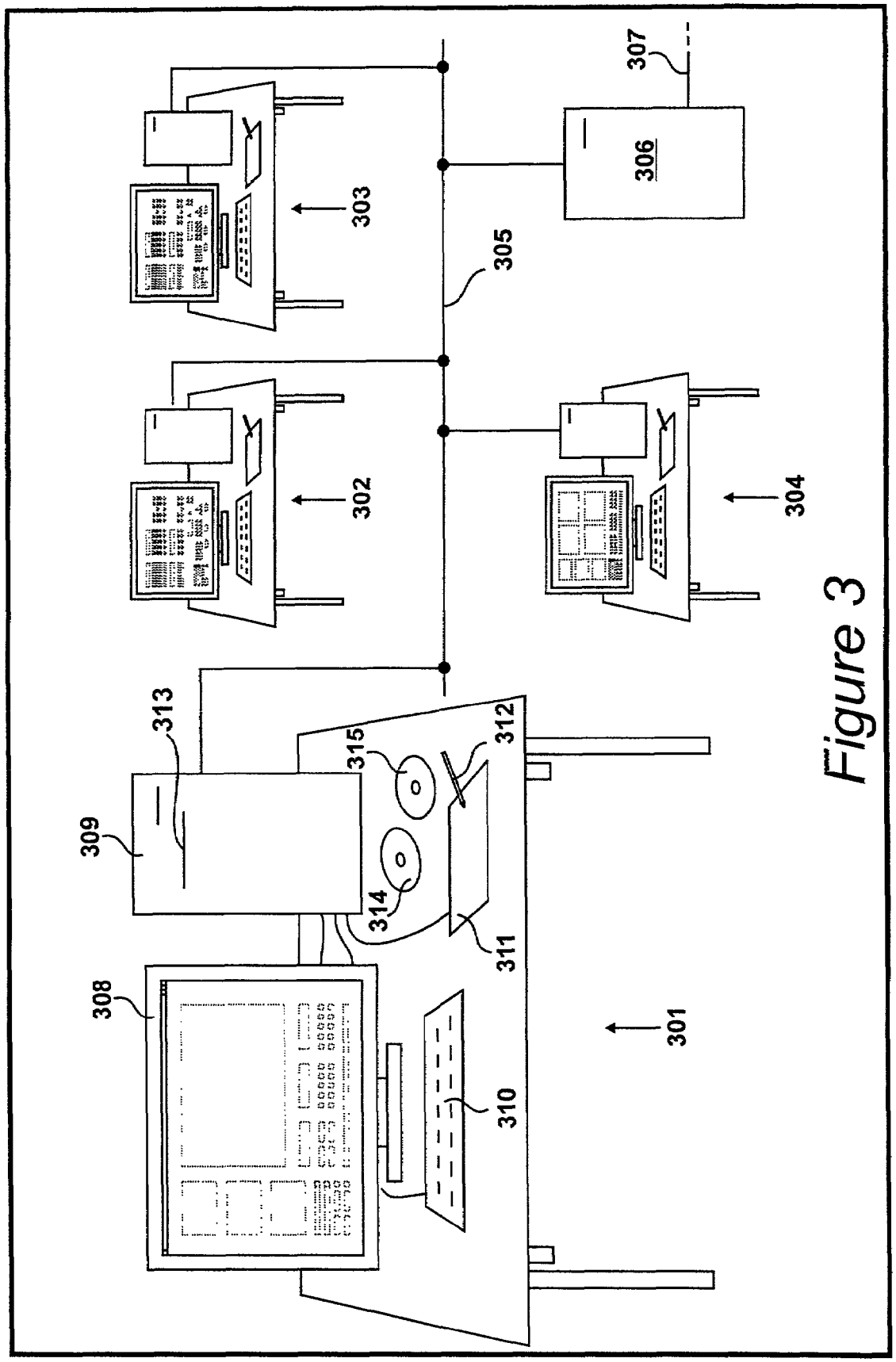
FIG. 3 details the animation design house shown in FIG. 2, including an animation editing workstation including a monitor, a processing system, a CDROM and a CD-R disc.

Equipment present in the animation design house 201 shown in FIG. 2, is detailed in FIG. 3. Several animation editing workstations 301 to 304 are connected to a network 305. A server 306 is also connected to the network 305, and provides facilities for data storage and connection 307 to the Internet. A workstation 301 includes a monitor 308 and a processing system 309. A keyboard 310 and a graphics tablet 311 are connected to the processing system 309. A stylus 312 is used to provide graphical input to the processing system 309 via the graphics tablet 311. The processing system includes a CD-RW (compact disc read-write) drive 313. A CDROM 314 includes data structures defining instructions that, once installed upon the processing system 309, enable a user at the workstation 301 to create and modify animations. A CD-R (recordable compact disc) 315 may be recorded by the user once an animation has been created, and the disc 315 contains a data structure that defines the animation that has been designed.

Several users, at each of the different workstations, may collaborate upon the design of a single animation, or alternatively work on different animations. The server 306 may be used to hold animation data and or instructions centrally, or alternatively, data and or instructions may be stored locally at each workstation, depending upon the nature of each job, and the amount of data that needs to be stored. As an alternative to storing an animation on the CD-R disc 315, such information and or instructions may be transferred to their destination over the Internet, by the connection 307 with the server 306.

Figure 4:
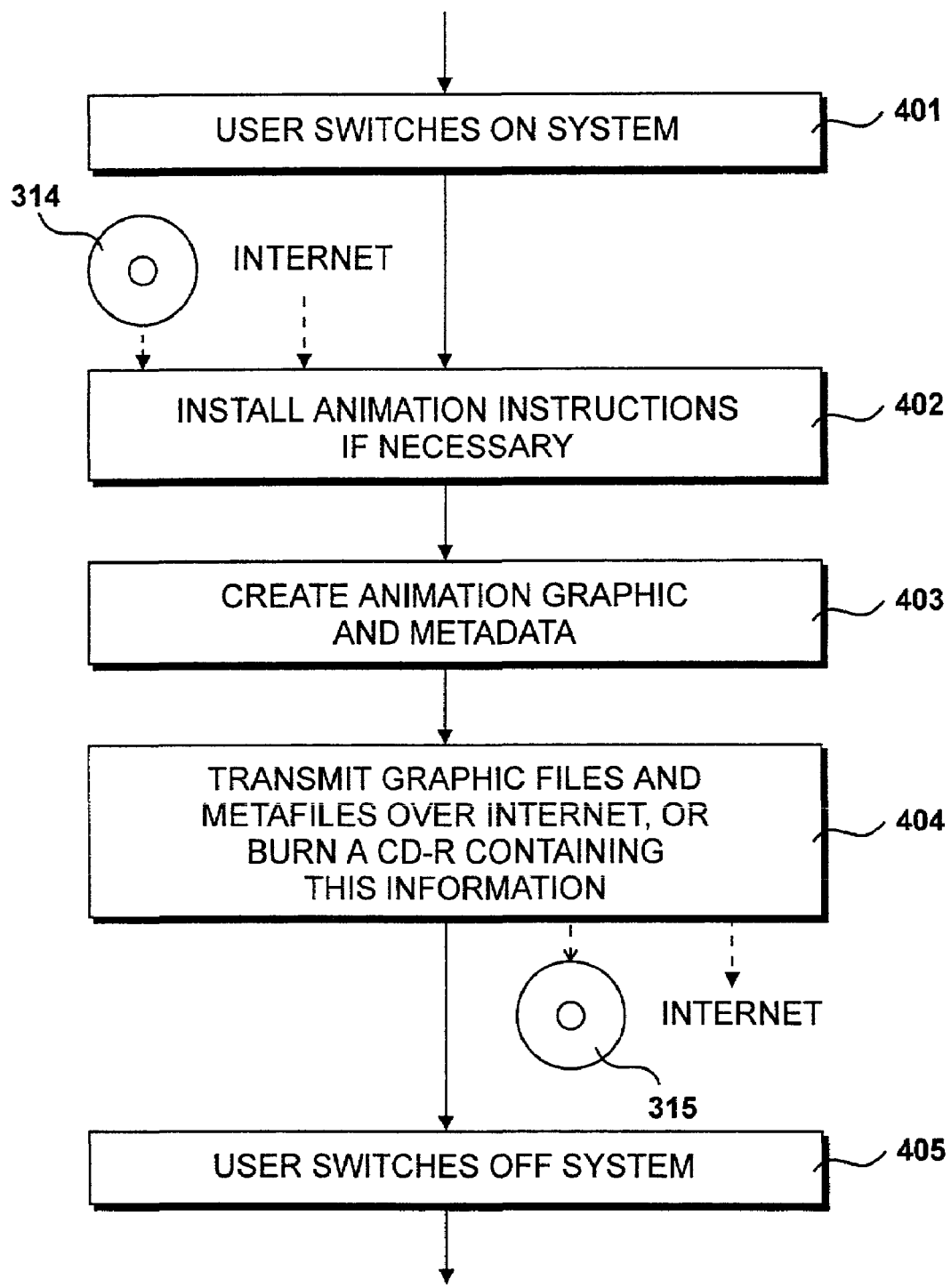
FIG. 4 details workflow performed by a user of the animation editing workstation shown in FIG. 3, including a step of creating an animation, and a step of transferring data.

A summary of the typical workflow performed by the user of the workstation 301 shown in FIG. 3, is shown in FIG. 4. At step 401 the user switches on the processing system 309. At step 402 instructions for creating and or modifying an animation are installed if necessary. The instructions may be supplied on the CDROM disc 314, or downloaded by ftp (file transfer protocol) over the Internet 202. At step 403 an animation graphic file is created by the user, along with metadata which defines how the graphic file can be used. The metadata is stored as a separate file, referred to as a metafile. At step 404 the graphic file and the metafile are transmitted over the Internet to the newsroom 203. Alternatively, a CD-R 315 is created, containing a data structure representing these files, and the CD-R disc 315 is transmitted physically to the newsroom 203. At step 404 the user switches off the processing system 309.

Figure 5:
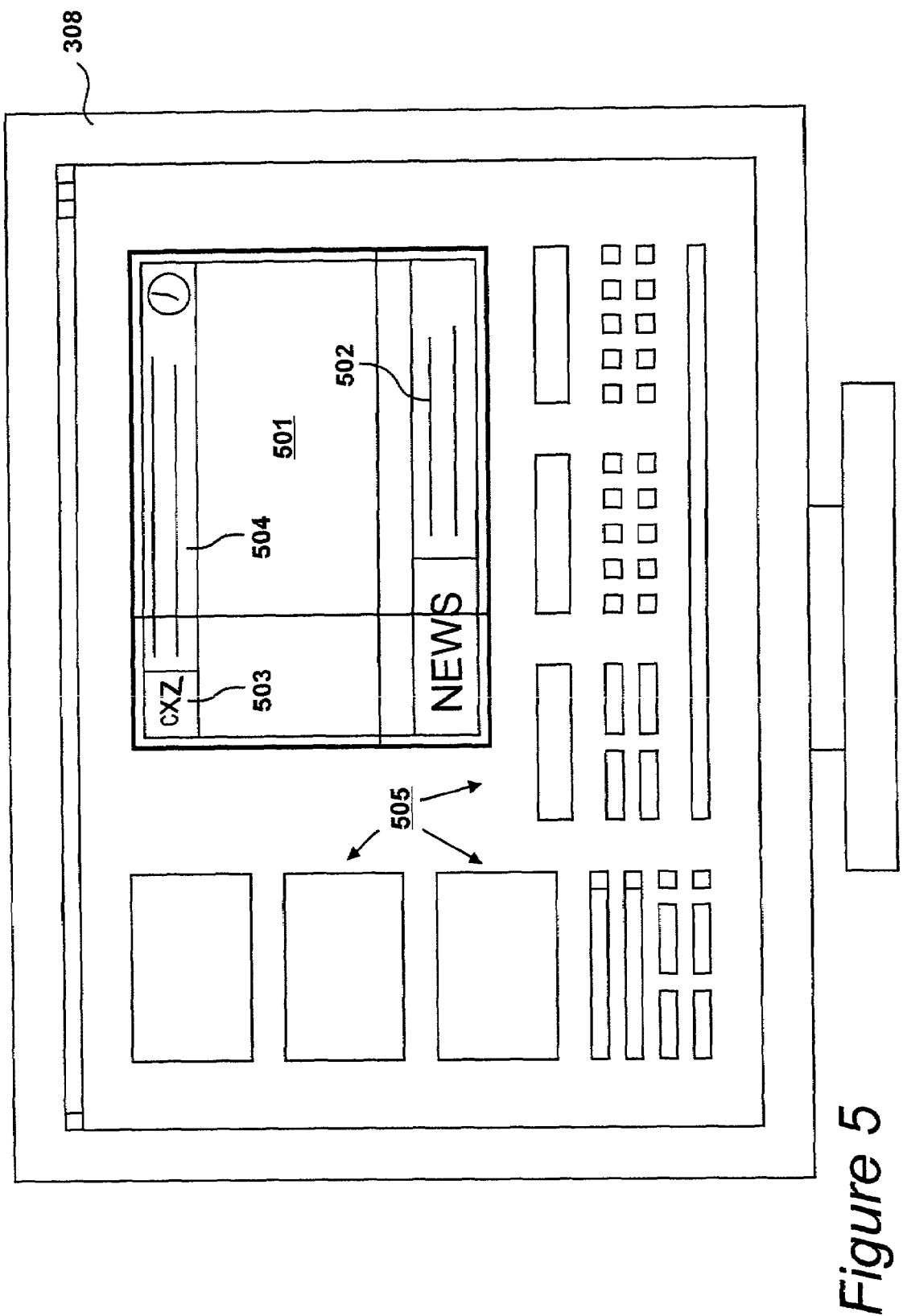
FIG. 5 details a screenshot of the monitor shown in FIG. 3 during the step of creating an animation shown in FIG. 4.

A screenshot of the monitor 308 shown in FIG. 3, during creation of an animation, is shown in FIG. 5. The screen area includes a preview area 501 in which the user may interact graphically with the animation. In the example shown in this Figure, graphical components for a news summary are shown. The animation shown here is simple, for purposes of clarity. However, many complex three-dimensional objects may be created, whose characteristics change over the duration of a broadcast. For example, a virtual studio may be created, in which the view angle and zoom of a virtual camera are linked with those of the real camera in the studio 204.

The animation comprises three parts, assigned to broadcast, distribution and viewer respectively. The animation designer decides the characteristics of most of the animation, and leaves certain characteristics open, or unlocked, which are to be later modified by the broadcaster, distributor and viewer according to their particular needs. The design in FIG. 5 includes a broadcast region 502, taking up a large part of the bottom of the screen. A distributor region 503 occupies the upper left of the screen, and a viewer region 504 takes up the rest of the top part of the screen. The relative sizes of these regions may vary widely. For example, the distributor region 503 may be made larger in order to accommodate advertisements.

All these characteristics are defined largely by the animation designer, by the assembly of primitive objects such as cubes, spheres, text and other shapes. The characteristics have to be defined not only statically, but also over time, and in response to certain cues. The creation of such animations is a highly skilled and time-intensive process. The cost of generating an animation is high. A user interface 505 enables the artist who designs the graphic to set up, modify and control the various components of the animation.

Figure 6:
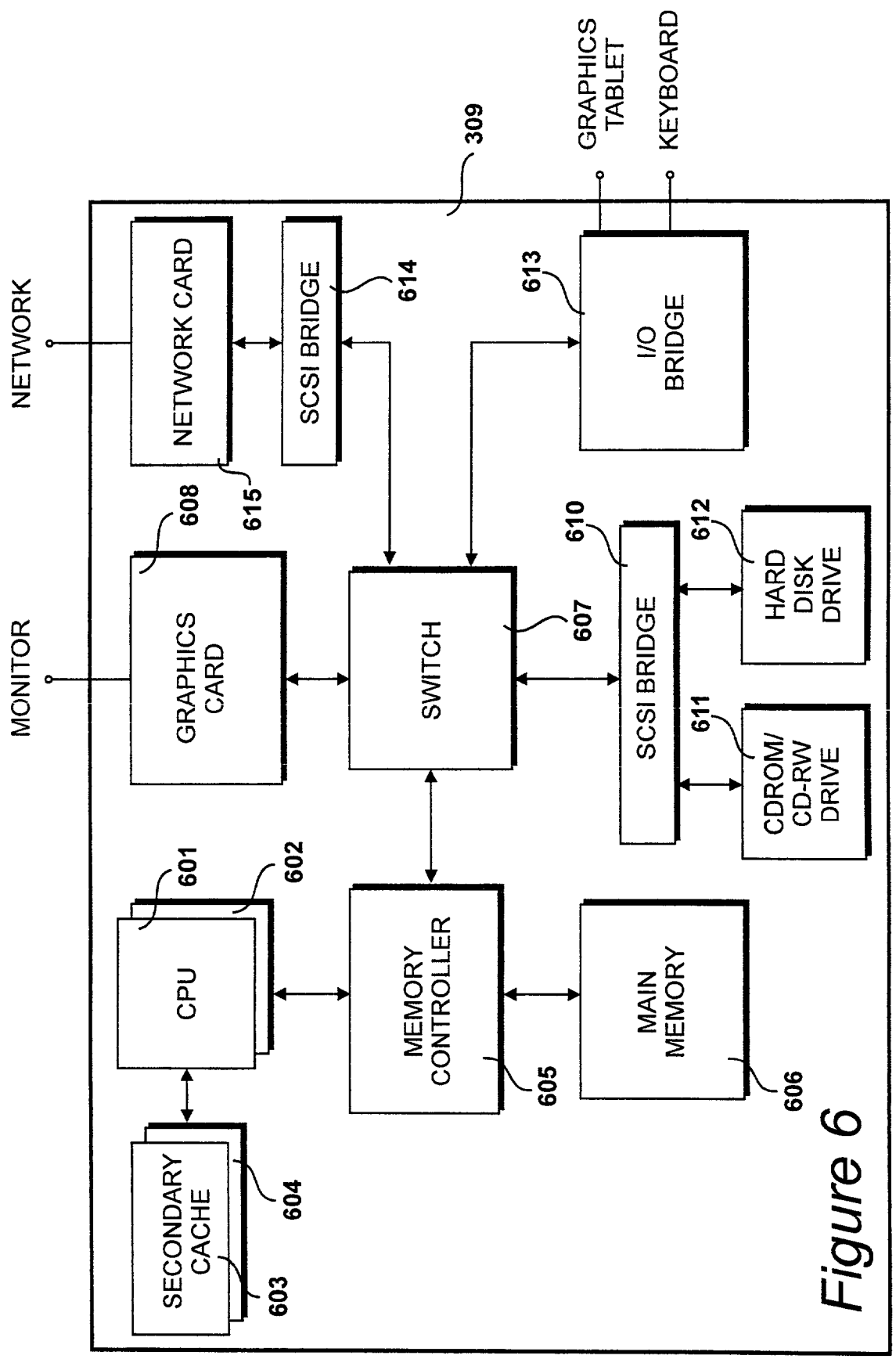
FIG. 6 details hardware components of the processing system shown in FIG. 3, including a main memory.

The main components of the processing system 309 shown in FIG. 2, are detailed in FIG. 6. The processing system 309 is an Octane™ produced by Silicon Graphics ™ Inc. It comprises two central processing units 601 and 602 operating in a symmetrical multi-processing (SMP) configuration. Each of these processors is a MIPS R12000 ™ manufactured by MIPS ™ Technologies Incorporated, of Mountain View, Calif. Each of the processors 601 and 602 has a secondary cache memory 603 and 604 that facilitate per-CPU storage of frequently used instructions and data. Each CPU 601 and 602 further includes separate primary instruction and data cache memory circuits on the processor chip, thereby providing an additional level of processing efficiency. A memory controller 605 provides the connection between the processors 601 and 602 and a rosin memory 606. The main memory 606 comprises two gigabytes of dynamic RAM.

The memory controller 605 facilitates connectivity between the aforementioned components of the processing system 309 and a high bandwidth non-blocking crossbar switch 607. The switch makes it possible to provide a direct high bandwidth connection between any of several attached components. These include a graphics card 608. The graphics card 608 receives instructions from the processors 601 and 602 to perform various types of graphical image rendering processing, resulting in animated images, and an editing interface for the animation, being rendered on the monitor 308.

A SCSI bridge 610 facilitates connection between the crossbar switch 607 and a DVD/CD-RW drive 611. The DVD/CD-RW drive is used to install instructions for the processing system 309 onto a hard disk drive 612. The DVD/CD-RW drive 611 may also be used to create CD-R discs containing large quantities of instructions and or data. Instructions located on the hard disk drive 612 may be transferred into the main memory 606 for execution by the processors 601 and 602. An input output (I/O) bridge 613 provides an interface to the graphics tablet 311 and the keyboard 310, through which the user interacts with the processing system 309. A second SCSI bridge 614 provides an interface with a network card 615, that provides a network connection between the processing system 309 and the network 305.

In alternative embodiments, the processing system 209 may be an Onyx2 ™, an Octane2 ™ or an 02 ™.

Figure 7:
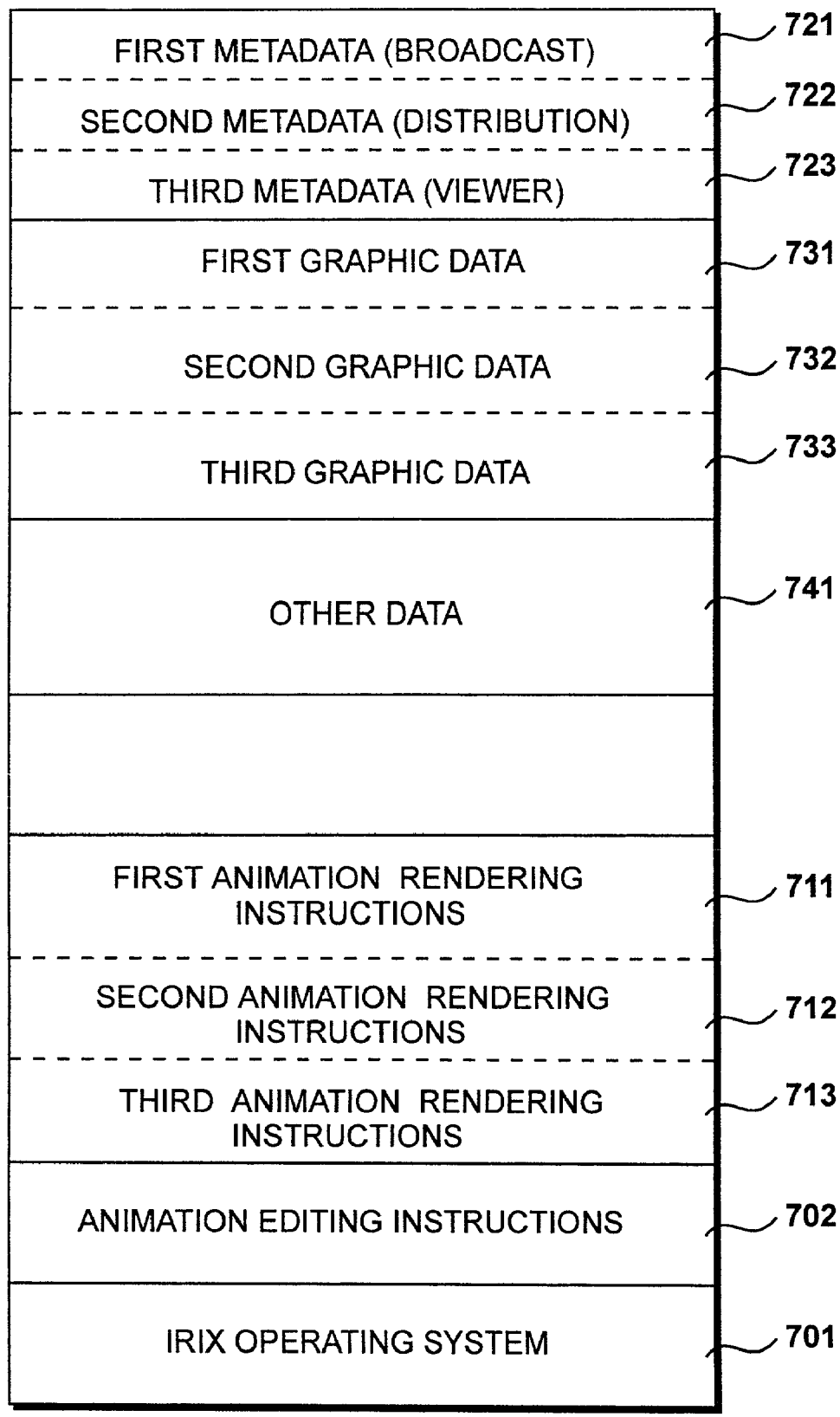
FIG. 7 details contents of the main memory shown in FIG. 6 as they would appear during the step of creating an animation shown in FIG. 4, including metadata, graphic data, animation rendering instructions and animation editing instructions.

The contents of the main memory 606 shown in FIG. 6, as they would appear during step 403 in FIG. 4, are detailed in FIG. 7. An operating system 701 provides common system functionality for instructions executing on the processors 601 and 602. The operating system 701 is the Irix™ operating system, available from Silicon Graphics Inc. Animation editing instructions 702 are required for generating an animation. First rendering instructions 711 are required to preview the results of editing operations carried out by the user, and also to render animated objects during broadcast. Second rendering instructions 712 and third rendering instructions 713 will be supplied to distributors 102, 103, 104 and viewers 105 to 110 respectively, so that additional objects may be rendered in response to local requirements.

First metadata 721 defines first unlocked parameters for use by a broadcaster 101. Second metadata 722 defines second unlocked parameters for use by a distributor 102. Third metadata 723 defines third unlocked parameters for use by a viewer's television set 105. First graphic data 731 defines first locked parameters for use in a broadcast. Second graphic data 732 defines second locked parameters for use in distribution 102. Third graphic data 733 defines third locked parameters for use in a receiving apparatus 105. Graphic data 731, 732, 733 includes data defining the animation in terms of its basic ingredients, including object primitives and their geometrical attributes, that are created by the animation artist working at the workstation 201. Metadata 721, 722 and 723 defines characteristics that may be further modified after an animation has been designed. Other data 741, includes data required for the operating system 701, and other instructions 702, 711.

Figure 8:
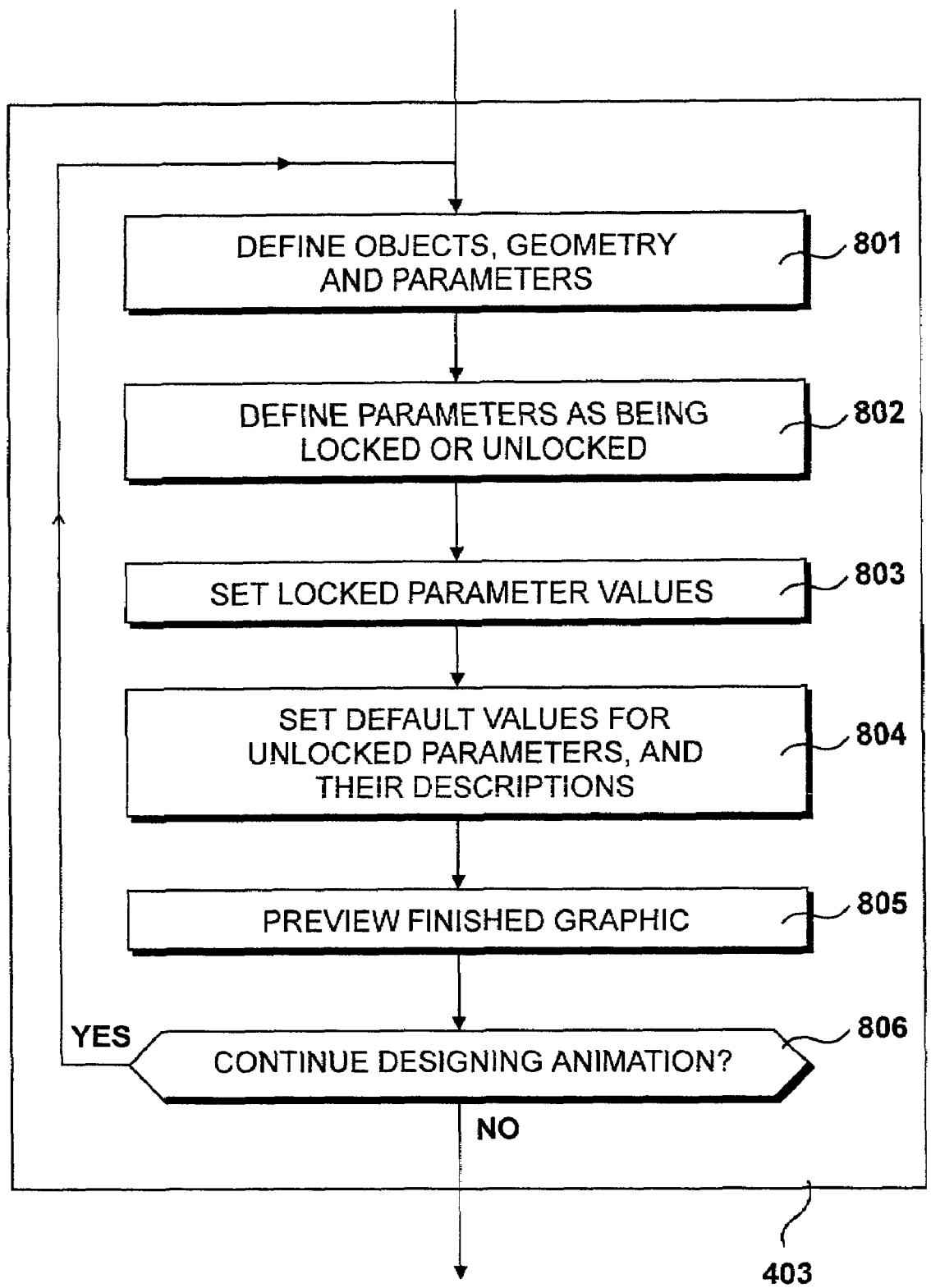
FIG. 8 details the step of creating an animation shown in FIG. 4 in accordance with the instructions for editing an animation shown in FIG. 7 and which originated from the CDROM shown in FIG. 4.

Creating an animation graphic and metadata, as performed at step 403 in FIG. 4, is detailed in FIG. 8. At step 801 the user defines objects, geometry and parameters for the animation. Such manipulations are performed using the user-interface shown in FIG. 5, in combination with operations of the keyboard 310 and or graphics tablet 311. Also at this step, the user defines whether an object or geometry is intended for broadcast, distribution or viewer rendering. At step 802 the user categorises parameters as being locked or unlocked. At step 803 the user sets the values for locked parameters.

Unlocked parameters for broadcast are stored in first metadata 721, unlocked parameters for distribution are stored in second metadata 722, and unlocked parameters for viewing are stored in third metadata 723. Locked parameters for broadcast are stored in first graphic data 731, locked parameters for distribution are stored in second graphic data 732, and locked parameters for viewing are stored in third graphic data 733. In an alternative embodiment second and third metadata and graphic data are designed separately and independently of first metadata and graphic data.

At step 804 the user sets values, including default values, for unlocked parameters. Also, the user defines a description for each of the unlocked parameters. At step 805 the finished graphic is previewed. At step 806, a question is asked as to whether to continue with animation design. If so, control is directed to step 801. Alternatively, this completes the steps performed during creation of an animation.

The steps of FIG. 8 are descriptive of the operations performed by an artist creating an animation. However, the order of these steps is not necessarily as shown, and in practice, the order is random, due to the nature of the graphical user interface 501, 505. Each of the described operations in these steps may be performed separately, in combination with, and in any order, with respect to any of the other described operations in this Figure. Steps 801 to 806 are intended to delineate operations which will require specific reference.

The transmission of graphic files and metafiles, shown at step 404 in FIG. 4, is illustrated in FIG. 9. Metadata 721, 722, 723 is supplied as metafiles 921, 922, 923 for inclusion on the CD-R disc 315. The metadata includes descriptions, default values, value fields and actual values of unlocked parameters, in accordance with operations performed at step 804 in FIG. 8.

Graphic data 731, 732, 733 defines first characteristics of an animation. The first characteristics are complex, and require definition by a skilled animation designer working in the animation design house 201. The broadcast graphic data 731 may be combined 901 with broadcast rendering instructions 711 to generate an executable graphic file 911. Similarly, distribution graphic data 732 and viewer graphic data 733 may also be combined with respective rendering instructions 712 and 713 to generate executable graphic files 912 and 913 respectively. The executable graphic files 911 to 913 are stored on the CD-R disc 315. These data structures may also or alternatively be transmitted over a network 305, and or over the Internet 202.

Metadata 721 is stored in a metafile 921 in XML (extensible mark-up language). An example of a metafile is shown in FIG. 10 and continued in FIG. 11. Each line has a line number, which is provided for reference purposes only. At lines 1001 and 1002 the data format is defined. In the preferred embodiment, metadata is known alternatively as page data, and this is reflected in some of the contents of line 1002. Lines 1004 and 1005 are a single XML statement defining the page name, or the identity of the metadata. Within this line is the text: graphicName="dave_scene". This refers to the name of the graphic data 731 contained within the graphic file 911. Line 1004, therefore, contains an instantiation of the animation components defined in the broadcast graphic. Unlocked parameters in the broadcast metadata 721 may be adjusted in accordance with the requirements of a specific news story.

At line 1006 a reference ID number is defined. This associates the following XML lines with a specific parameter link that is contained within the graphic data 731. In this way the locked parameters in the graphic data 731 may be combined with unlocked parameters in the metadata 721 to fully define the appearance and characteristics of the animation rendered by the broadcast station 101. Lines 1007 to 1014 complete the definition of a single unlocked parameter. The value is defined in the value field at line 1007. The type of parameter and its default value are defined at line 1008. The parameter's range is defined at lines 1009 and 1010, in this case, in the form of a maximum and minimum value for a floating point number. At line 1013, the parameter's description is defined.

The contents of lines 1007 to 1013 are defined initially by the artist at the workstation 301, who is responsible for the detailed design of the graphic. The parameter's value, shown at line 1007, may be subsequently changed by anyone who has access to the broadcast metafile 921. This is considered as providing a second level of user access to animation characteristics. The information provided in lines 1008 to 1013 provides subsequent users with enough information to sensibly select different values of the parameter, without necessarily having full and detailed knowledge of characteristics encoded in the graphic data 731. For example, the default value at line 1008, provides a suitable alternative for the parameter's value at line 1007, even when the user might have no idea what effect this value has on the appearance of the resulting animation. The designer of the graphic carefully chooses default values, so that subsequent users of the system can receive helpful information as to what kind of values are suitable for the value field at line 1007. In this respect, the designer of the animation designs how its user interface operates, and can guide the method by which the animation is customised to the requirements of an individual news story.

A similar parameter definition is provided at lines 1015 to 1023. The broadcast metafile 921 continues in FIG. 11. A third parameter is defined at lines 1024 to 1032. In this case, the parameter is a string of characters. Again, a default value is provided. The range for a string of characters is partly defined in terms of its maximum length, as shown at line 1027. At line 1028, certain characters are defined as being invalid for the string. Lines 1027 and 1028 may be considered as defining a range of permissible characteristics for the parameter. A fourth parameter is defined at lines 1033 to 1045. In this case, the parameter is defined as having one of several pre-set values. These pre-set values are defined in lines 1036 to 1041. This type of parameter is known as an enumerated type, as indicated at line 1035, along with a default value. The instantiation of graphic data is completed by the end-of-page tag at line 1046.

Metadata typically consists of many dozens of such parameter definitions. Each definition provides the user with a means for accessing an unlocked characteristic of the resulting animation. Parameters that are defined in this way are known as unlocked parameters, whereas locked parameters are defined as part of the graphic data 721. Unlocked parameters are accessible at a second level of user access, whereas locked parameters are accessible only at a first level of user access.

Figure 12:
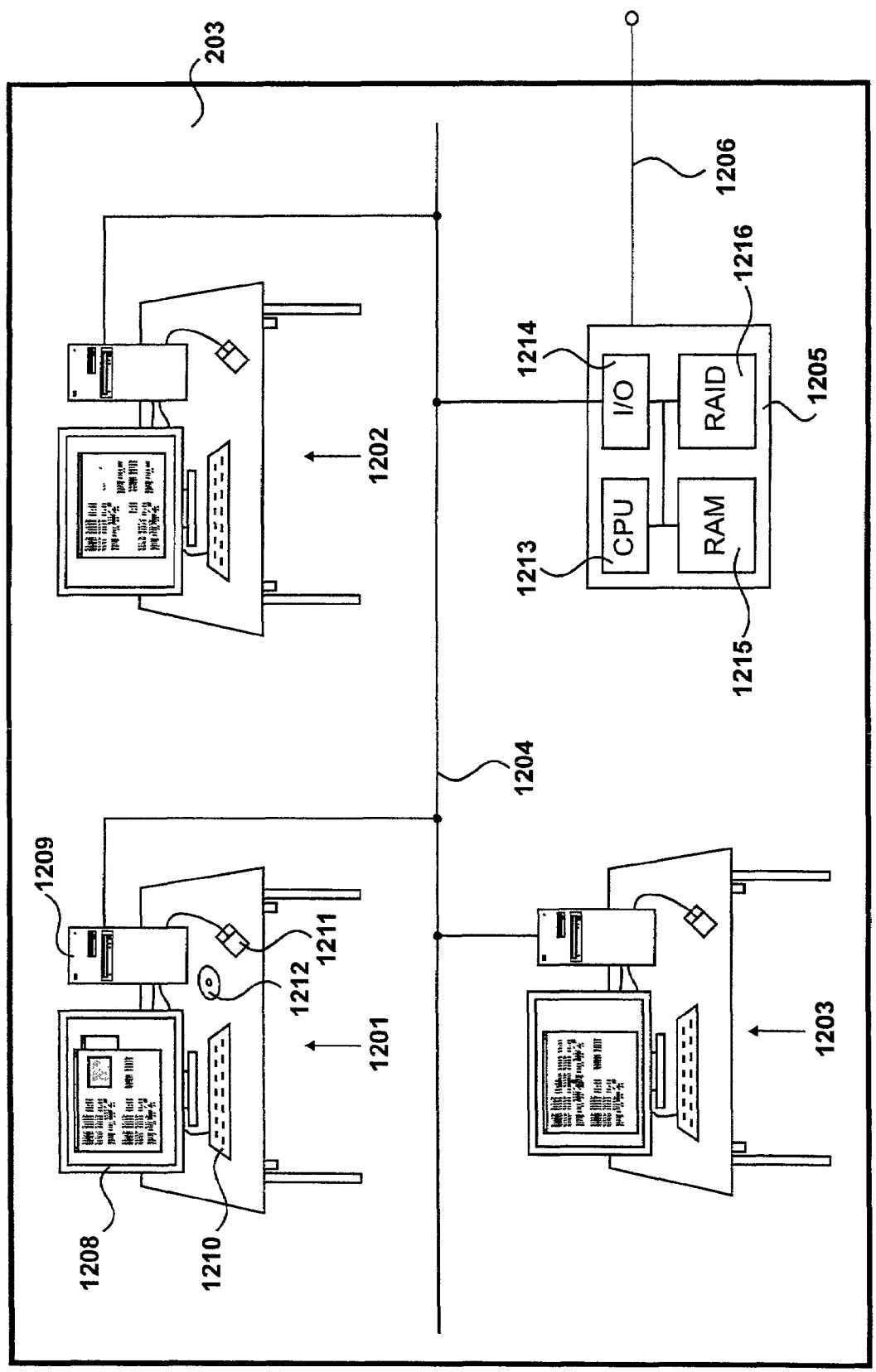
FIG. 12 details the newsroom shown in FIG. 2, including a news editing workstation comprising a monitor and a processing system, a server and several other news editing workstations connected together via a network.

The newsroom 203 shown in FIG. 2 is detailed in FIG. 12. Equipment in the newsroom includes three news editing workstations 1201, 1202 and 1203. These are connected to a network 1204. A server 1205 provides central file storage facilities, and also provides a connection 1206 to the Internet 202. The first news editing workstation 1201 includes a monitor 1208, a processing system 1209, a keyboard 1210 and a mouse 1211. A CDROM 1212 contains instructions for editing metadata 721, which are installed on the processing system 1209. The server comprises a CPU 1213, input output circuitry 1214, random access memory 1215 and a redundant array of inexpensive disks (RAID) 1216, upon which news data, including broadcast metafiles 921, can be centrally stored.

Figure 13:
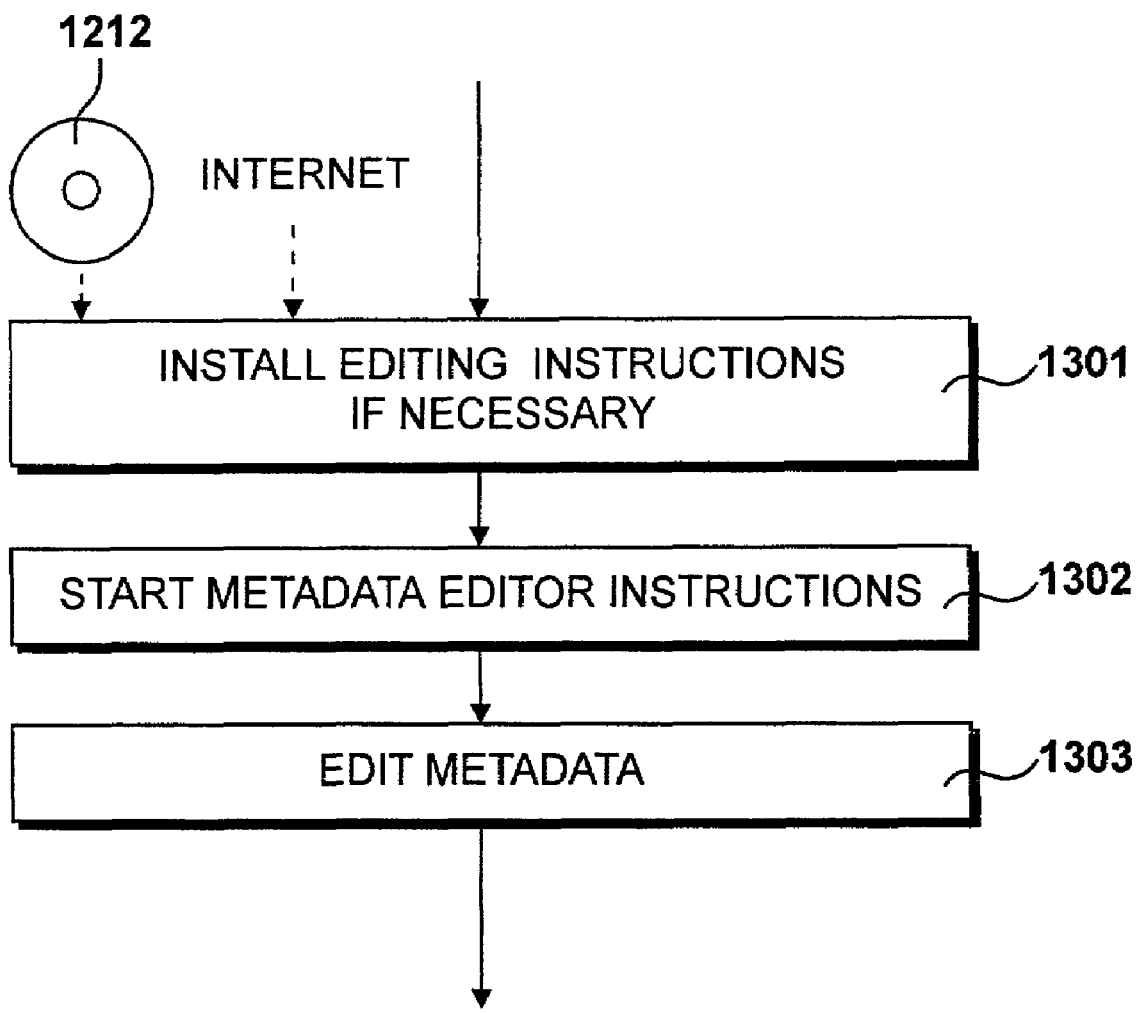
FIG. 13 details the workflow of a user operating the news editing workstation shown in FIG. 12, including a step of editing metadata.

The workflow of a user situated at the first news editing work station 1201 in FIG. 12 is summarised in FIG. 13. At step 1301 metadata editing instructions are installed if necessary. Installation may be from the CDROM 1212, or by download across the Internet. At step 1302 the metadata editor instructions are started, and at step 1303, the user edits the metadata.

Figure 14:
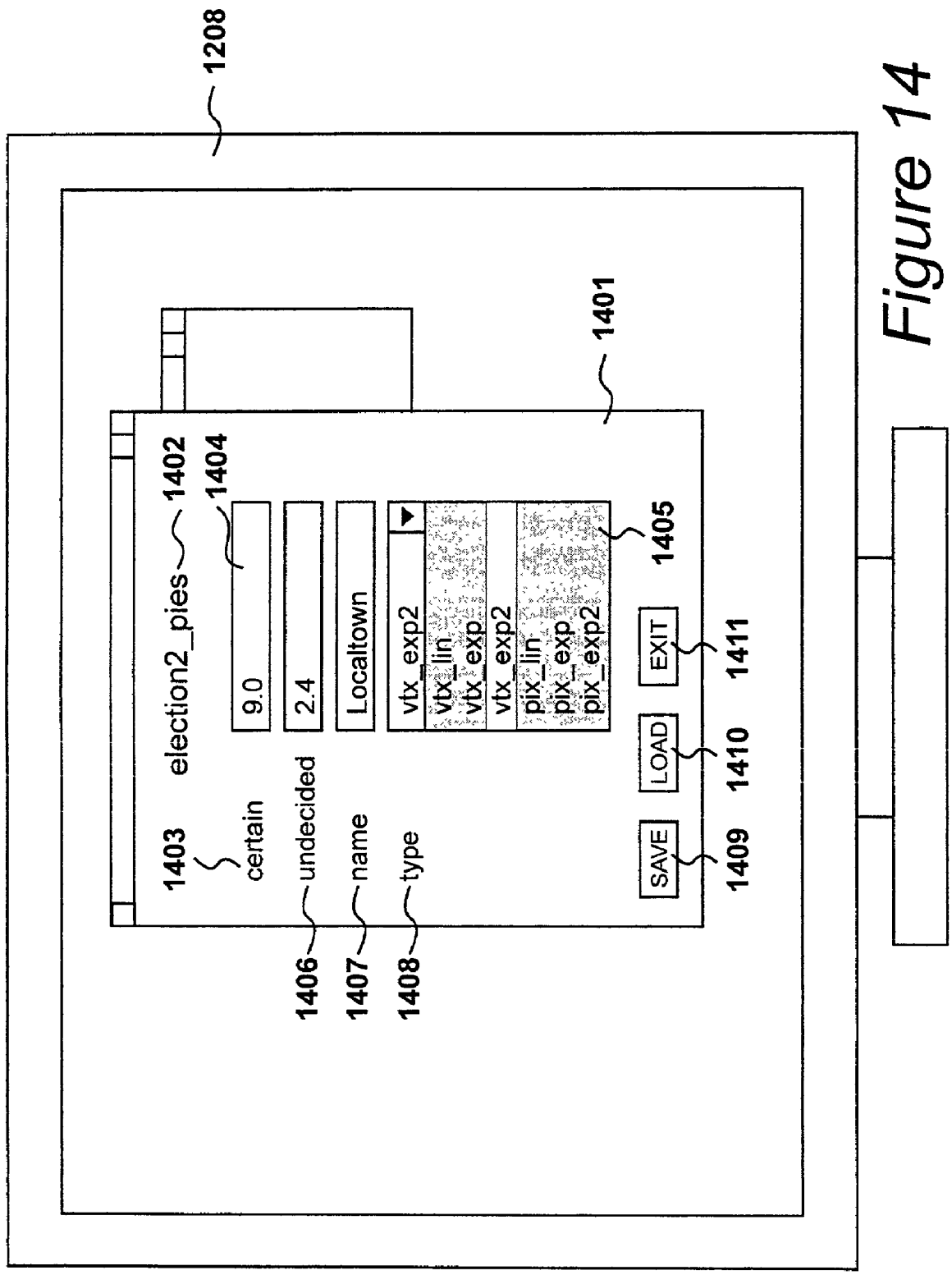
FIG. 14 shows a screenshot of the monitor shown in FIG. 12 during the step of editing metadata shown in FIG. 13.

A screenshot of the monitor 1208 shown in FIG. 12 during editing of the broadcast metafile 721, is shown in FIG. 14. The editor instructions create a window 1401 in which are defined fields for each parameter. The editing window 1401 has a title 1402. Each parameter has a description field and an editable value field 1404. The title 1402, description 1403 and value 1404 are each generated from data in the metafile 921. While editing a value field, the user may, with appropriate interactions with the graphical user interface, discover the default value recommended for an unlocked parameter by the designer of the animation, for example by right-clicking on the mouse 1211 while the cursor is located over a parameter description. Where a pre-set value must be selected, the interface provides a drop-down menu, as indicated at 1405, from which the user can select an appropriate value for the unlocked parameter.

Four parameters 1403, 1406, 1407 and 1408 are shown in FIG. 14. These correspond to the four parameters defined in the XML data structure shown in FIGS. 10 and 11. The user may set new values using the interface. The new parameter settings may be saved by activating a SAVE button 1409. Another page of XML may be edited using a LOAD button 1410, and the edit window 1401 may be closed by activating an EXIT button 1411.

Figure 15:
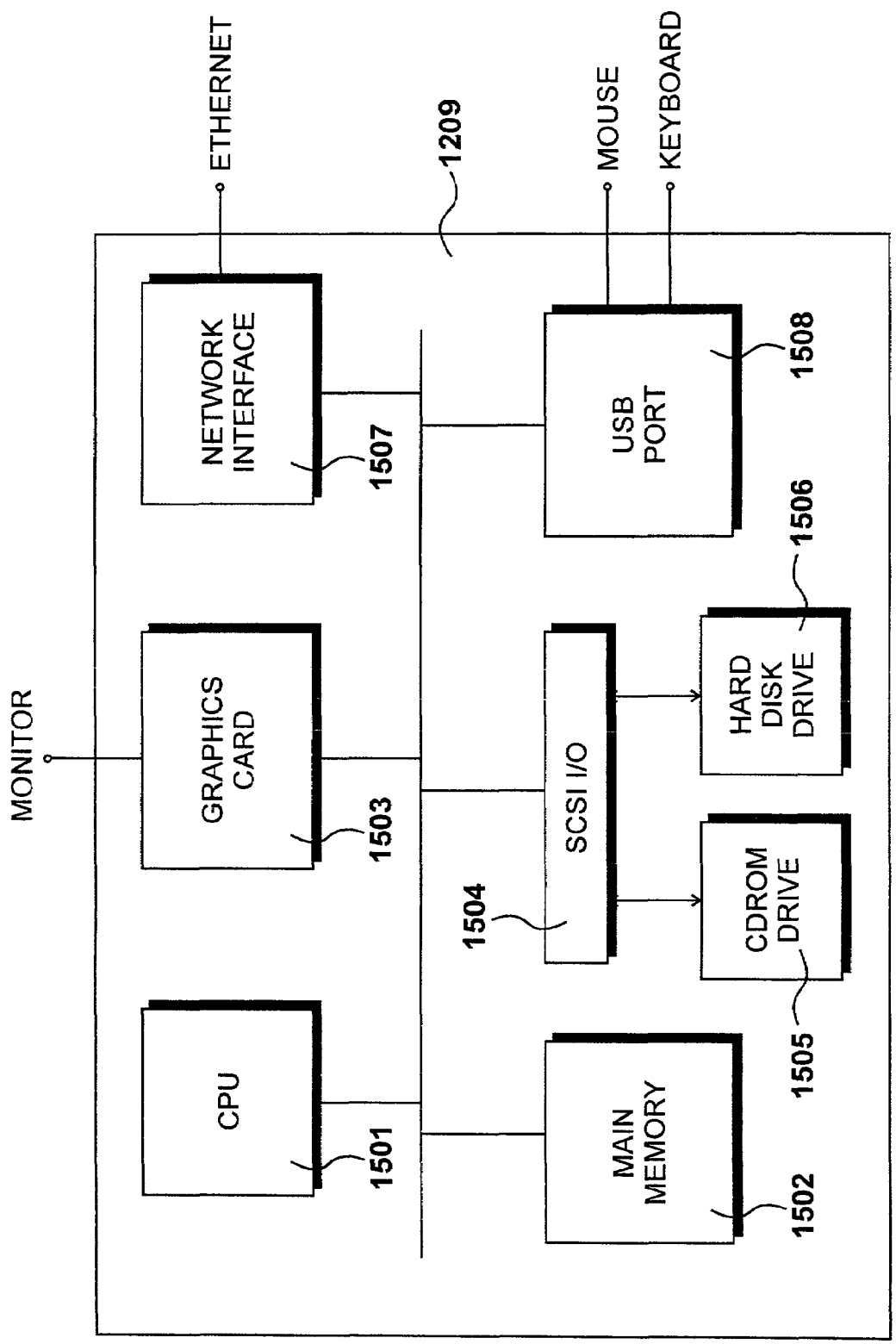
FIG. 15 details the processing system shown in FIG. 12, including a main memory.

The processing system 1209, used in the news editing workstation 1201 shown in FIG. 12, is detailed in FIG. 15. The processing system is a Power Mac G4 ™, available from Apple™ Computer Inc. The central processing unit 1501 is a G4, running at 533 MHz, details available from Motorola™ Inc. The CPU 1501 includes on chip primary instruction and data caches, and an off-chip secondary cache. The CPU 1501 is connected to a main memory 1502, in which are stored data, and instructions that are executable on the CPU 1501. A graphics card 1503 receives graphics commands front the CPU 1501 to render the window-based graphical user interface shown in FIG. 14. A SCSI input output (I/O) interface 1504 provides efficient communication with storage devices 1505 and 1506. These storage devices are a CDROM drive 1505 and a nine gigabyte hard disk drive 1306. A network interface 1507 provides the connection to the newsroom Ethernet network 1204. A Universal Serial Bus (USB) port 1508 provides connections to the keyboard 1210 and the mouse 1211.

In an alternative embodiment the processing system 1109 is a personal computer (PC) having an Intel Pentium™ processor.

Figure 16:
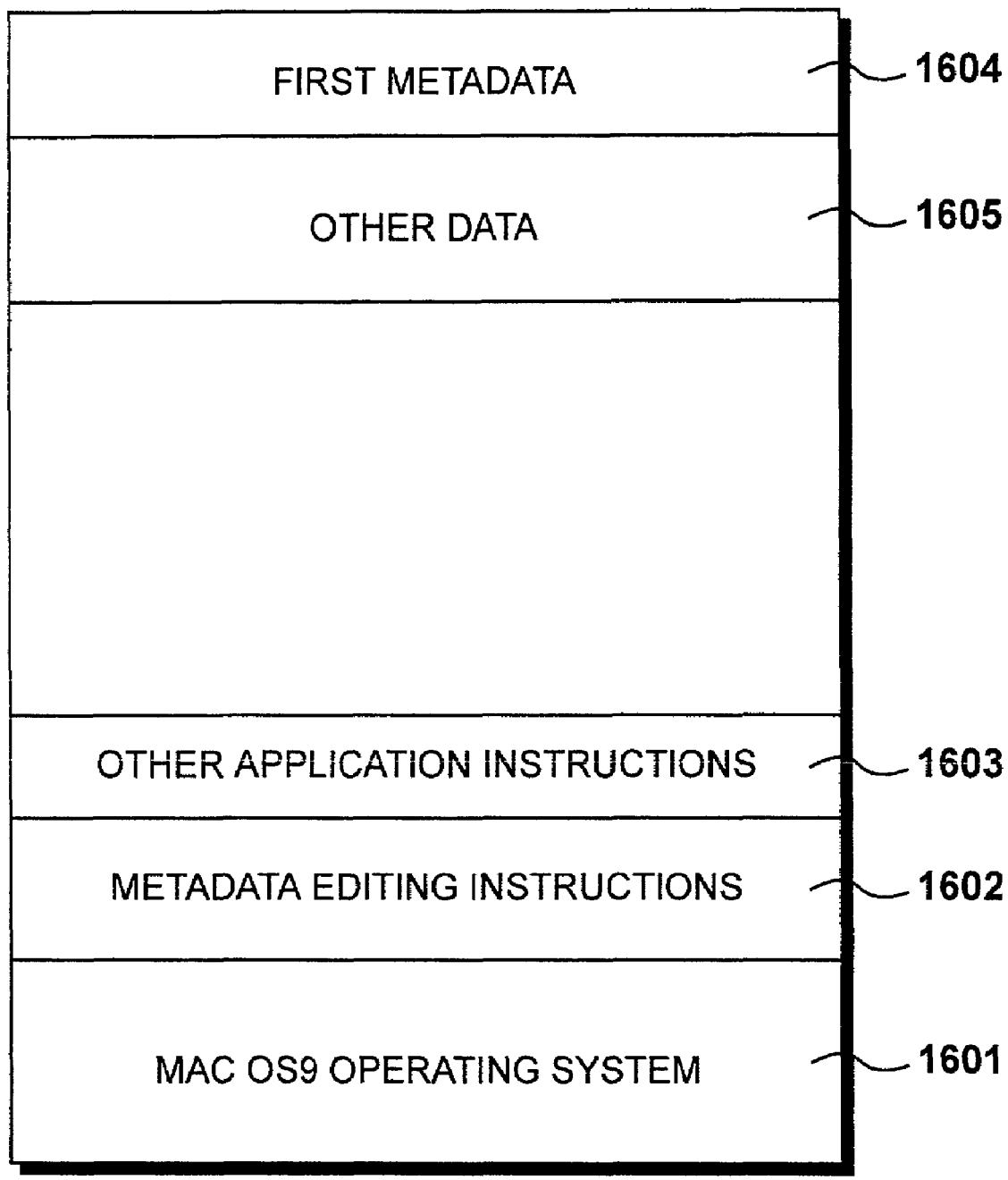
FIG. 16 details the contents of the main memory shown in FIG. 15.

The main memory 1502 shown in FIG. 15, is detailed in FIG. 16. A Mac OS9™ operating system 1601 provides common application processing functions, including interfacing instructions for the USB port 1508, the network interface 1507, and other peripherals. Metadata editing instructions 1602 include instructions for the editing interface shown in FIG. 14. Other application instructions 1603 include other applications and resident utilities such as those commonly provided in a processing system of this kind. Metadata 1604 is a modified version of the XML file 921 detailed in FIGS. 10 and 11. Other data 1605 includes data required for the correct operation of the instructions 1601, 1602 and 1603.

Figure 17:
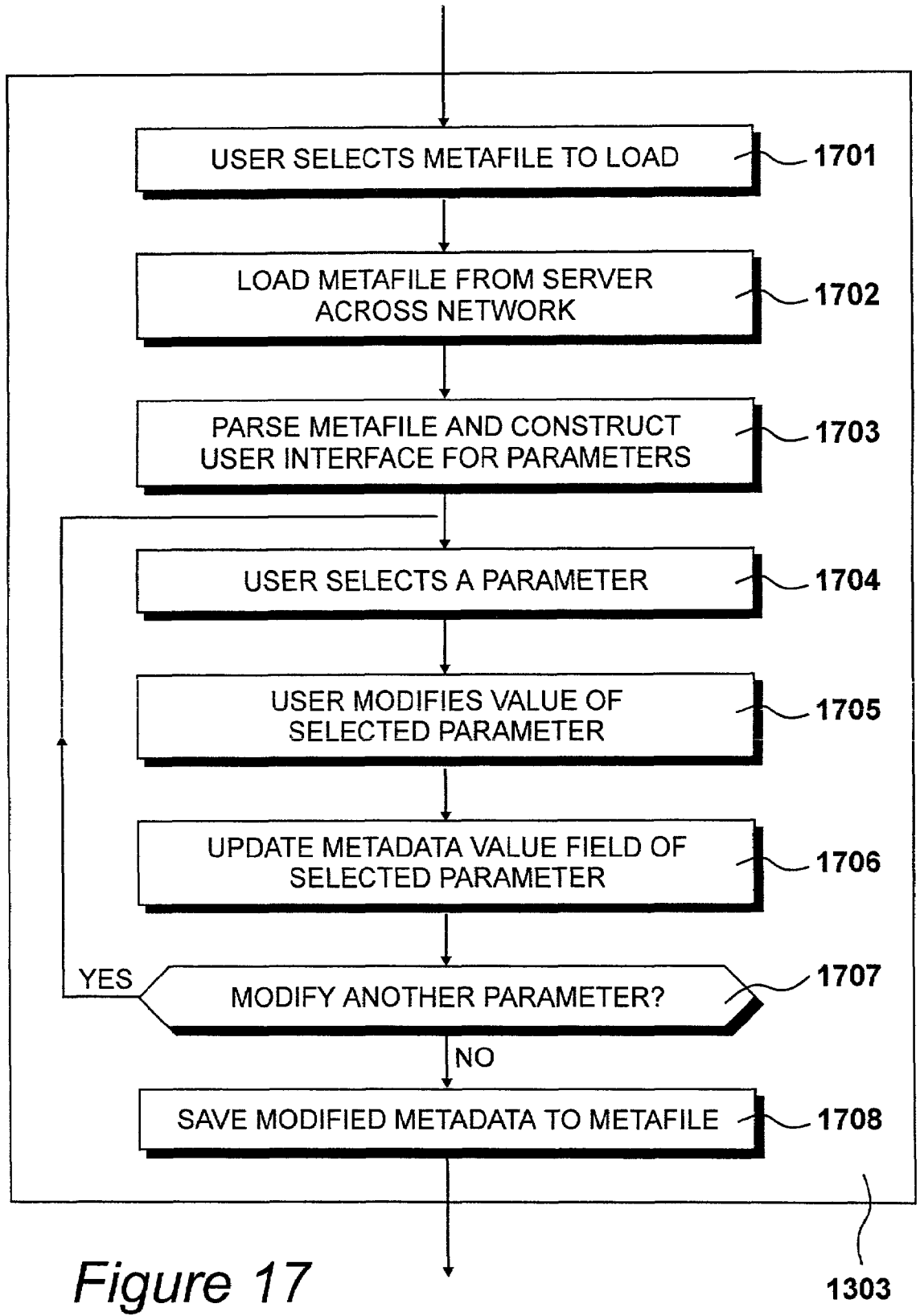
FIG. 17 details the step of editing metadata shown in FIG. 13, including steps of loading a metafile and saving a metafile.

The step of editing metadata, shown at 1303 in FIG. 13, is detailed in FIG. 17. At step 1701 the user selects a metafile for loading. At step 1702 the metafile 921 is loaded, via the network 1204, from the RAID 1216 in the server 1205. At step 1703 the metafile is parsed, and a user interface, as shown in FIG. 14, is constructed for the unlocked parameters. Steps 1704 to 1707 represent actions performed by the user while editing using the interface. At step 1704 the user selects a parameter, for example, by clicking on its value 1404. At step 1705 the user enters a new value for the selected parameter, either by typing one in, selecting the default, or by dragging with the mouse 1211 through a list of pre-set values 1405. At step 1706, the value field 1007, 1016, 1025 or 1034 is updated in the metadata. At step 1707 a question is asked as to whether the user wishes to edit another unlocked parameter. If so, control is directed to step 1704. Alternatively, control is directed to step 1708, where the modified metadata is saved as a new metafile 921 in response to the user activating the SAVE button 1409.

Figure 18:
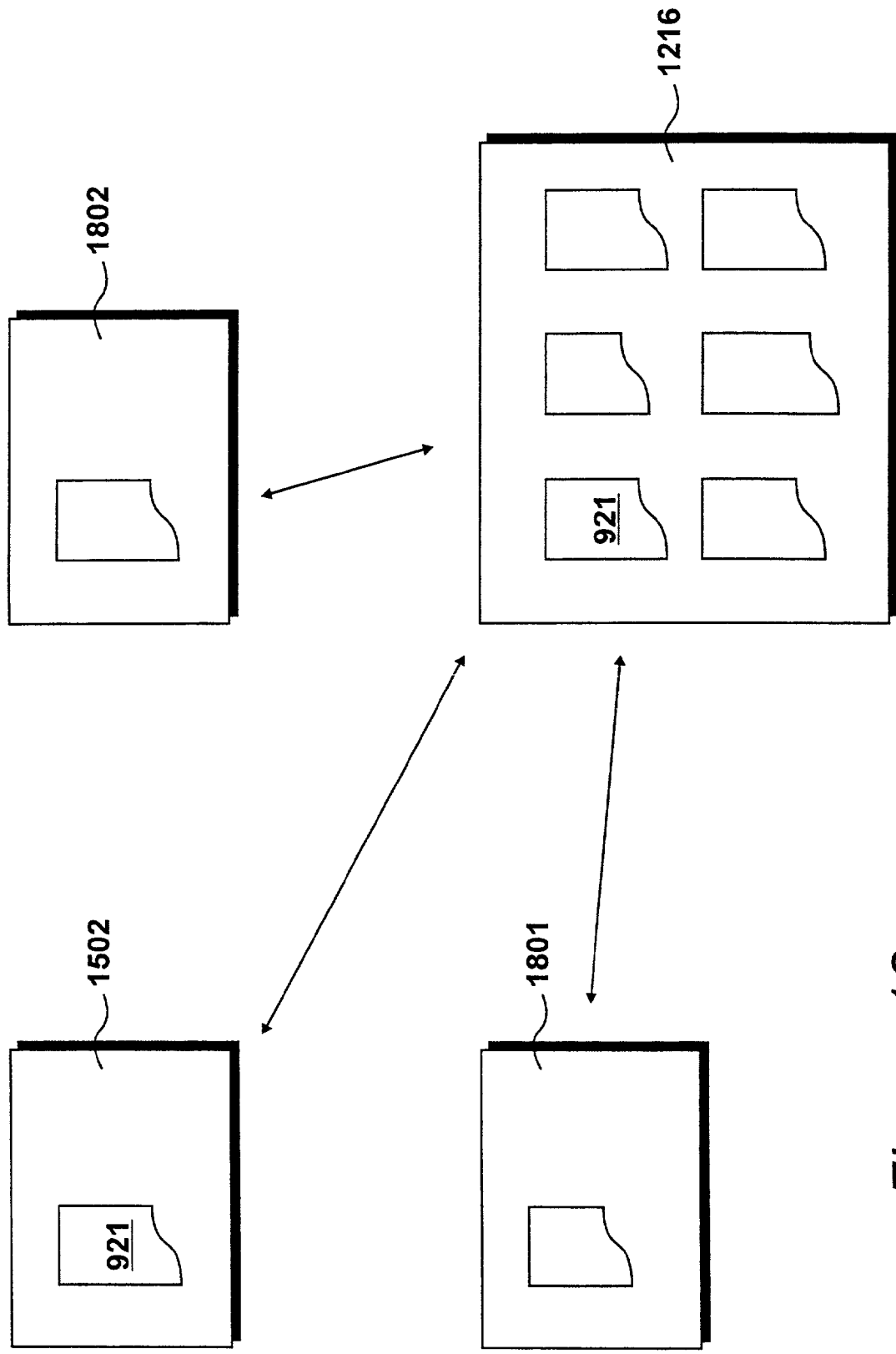
FIG. 18 illustrates the effect of the several workstations shown in FIG. 13 loading and saving several metafiles.

Newsroom activities are summarised in FIG. 18. Several news stories are being edited for a news program. The broadcast metafile 921 is being used for just one such story. It is loaded from the server's RAID 1216 across the network to the first workstation's memory 1502. There it is modified in accordance with a particular series of facts that are to be displayed as part of an animated graphic for the news program. Several other stories are provided with graphics in this way. The same graphic data 731 may be instantiated several times over several days, as a particular news story develops, but with slight variations each time it is put on air. Other news stories evolve similarly. Different metafiles and possibly different graphic data are used for these. However, the newsroom only needs access to the metafiles, as these contain the unlocked data that is to be modified by an editor or journalist. The main memories 1801 and 1802 of other computers also contain metafiles, which are loaded and saved to and from the server's RAID 1216. In this way, the newsroom quickly and efficiently maintains an up-to-date sequence of news stories, and their animations, by simple editing using an interface of the type shown in FIG. 14.

A metafile 921 is typically several kilobytes in size. This size of file is suitable for easy transfer over the Internet, and so remotely connected computers 206 and 207 can be used to edit metadata for a news story. In addition to writing an article, a journalist can also transfer a modified metafile back to the newsroom server 1205, where other aspects of the story can be updated by a news editor, or left unchanged. Graphic data 731, by contrast, is extremely large, and typically is many megabytes in size. Furthermore, the graphic data can only be modified with the aid of a powerful image processing workstation of the type shown in FIG. 3, and requires a different set of operator skills to do so.

The metadata 721 is encoded in such a way as to enable easy construction of a simple user interface, within which a user may modify values, or have value information supplied to them, in the form of default parameter values. By linking the unlocked parameter values with parameter characteristics, in the same file, a user is provided not only with parameter access, but also with information about parameters, such as their description, ranges and default values. The use of the XML open format, ensures that simple editing instructions can be created easily for a variety of processing environments. For example, an editor can be encoded as an ActiveX™ object for a Windows™ operating system.

The designer of the animation can determine what level of customisation the end user has access to. By selecting which parameters are locked, or left unlocked, the designer can ensure that end users are able to control as much of the animation as is appropriate to their needs, and not more. By restricting the interface in this way, the process of setting up an animation for a specific TV broadcast becomes greatly simplified. The editor, journalist or program maker, can concentrate on relevant characteristics, rather than being confronted with an enormous amount of information that is irrelevant for the finalisation of a television program.

Figure 19:
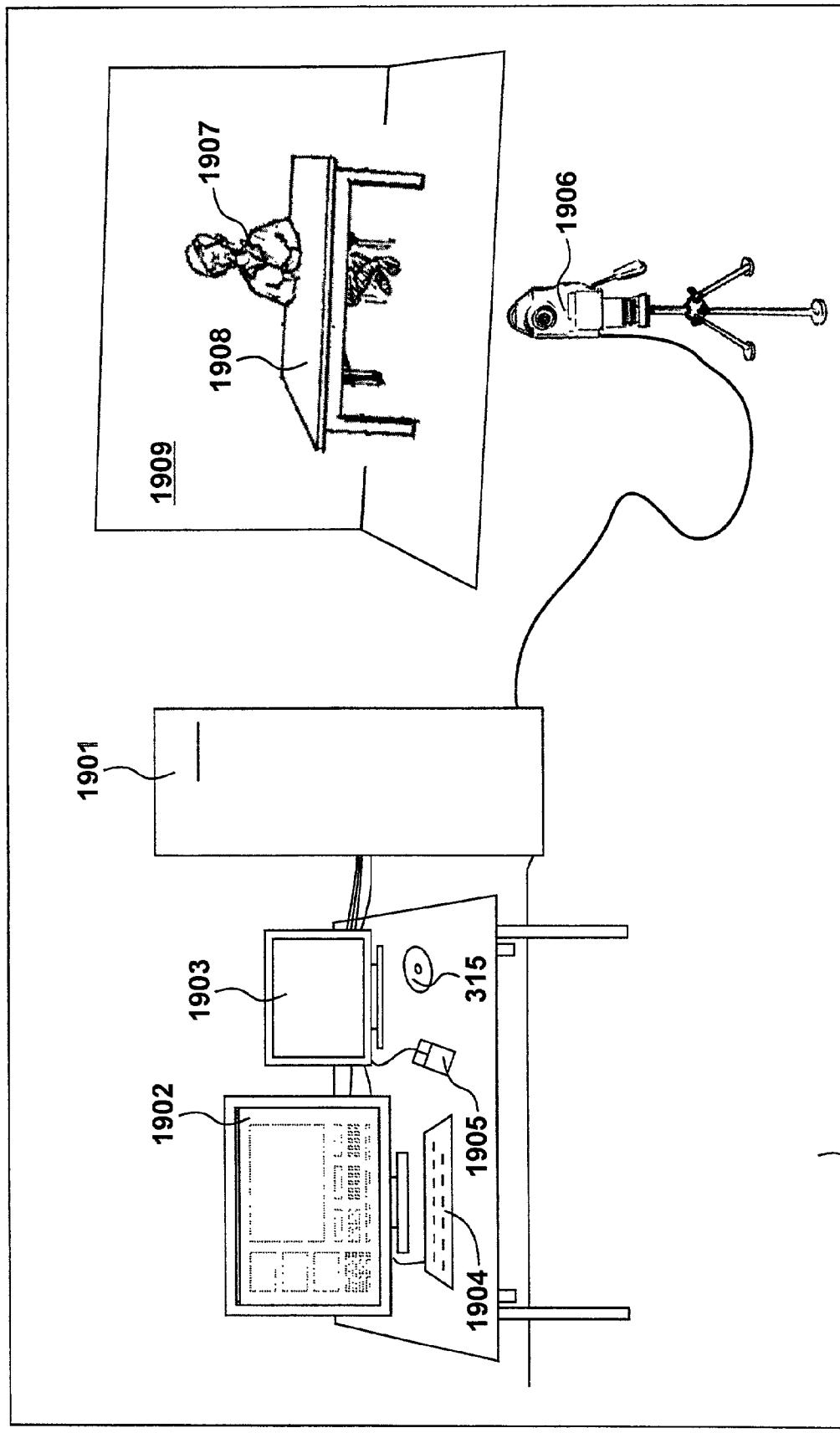
FIG. 19 details the television studio shown in FIG. 2, including an animation rendering workstation comprising a display monitor, a broadcast monitor and a processing system.

Once metadata 721 has been generated for a news story, it is supplied to the television studio 204 for use in a broadcast. The television studio 204 shown in FIG. 2 is illustrated in FIG. 19. A graphical rendering system comprises a processing system 1901, a monitor 1902, a broadcast monitor 1903, a keyboard 1904 and a mouse 1905. The processing system 1901 receives signals from a video camera 1906. A newsreader 1907 is located at a desk 1908 in front of a blue screen backdrop 1909. The processing system 1901 substitutes blue portions of the camera image with an artificial background. Background or foreground portions of the camera's image may be substituted for digitally generated image contents from an animation. During the news broadcast, an operator manually provides cues to the processing system 1901 via the keyboard 1904, in order to trigger the start of each new animation sequence as it is required for its associated news story. Alternatively, automatic cues may be provided via a studio network. Instructions for rendering an animation are loaded from the CD-R disc 315. The broadcast metafile 921 on this disk is not usually used. The broadcast metafile 921 is received instead, from the newsroom 203. Distribution and viewer metafiles 922 and 923 are loaded from the CD-R disc 315.

In an alternative embodiment, the blue portions of the camera image may be substituted with an artificial background using broadcast keyer equipment rather than the processing equipment 1901.

Figure 20:
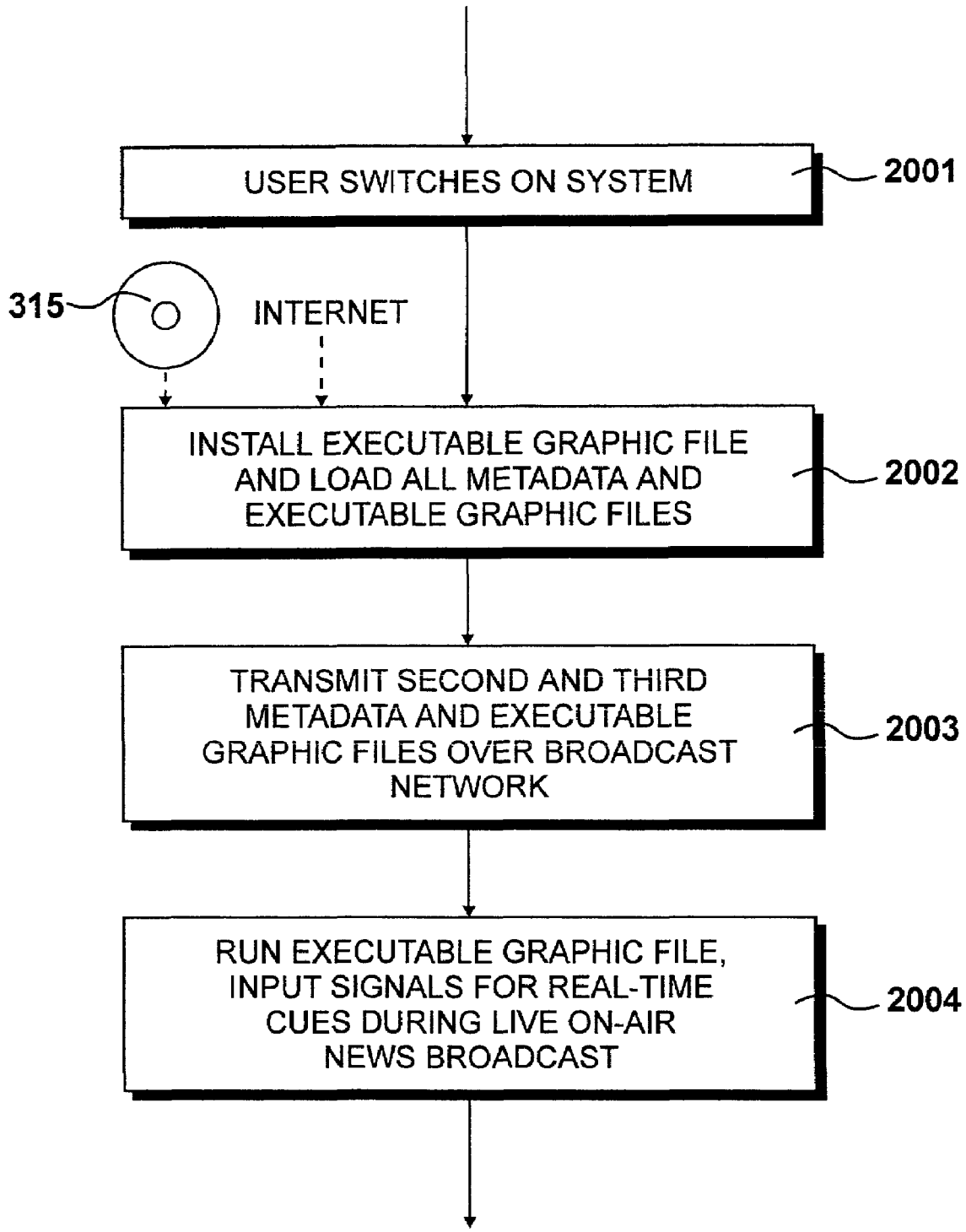
FIG. 20 details workflow performed by a user operating the animation rendering workstation shown in FIG. 19, including a step of running an executable graphic file.

The workflow associated with an operator of the processing system 1901 shown in FIG. 19 is detailed in FIG. 20. At step 2001 the user switches on the system prior to broadcast. At step 2002 the executable graphic file 911 is installed, either from the CD-R disc 315 or from the Internet. A metafile 921 for each news item is loaded from the newsroom 203 via the Internet 202. Other executable graphic files 912 and 913, and respective metafiles 922 and 923 are loaded, so that these may be transmitted as data to distributors 102, 103 and 104 at step 2003. At step 2004 the executable graphic file 911 is executed, the operator supplies cue signals for each animation, and the broadcast proceeds.

Throughout the news program, the processing system 1901 generates digital animated images that are combined with signals from the camera 1906. Most of the time, the only part of the camera image that is retained is that of the image of the newsreader herself. The monitor 1902, shown in FIG. 19, can provide a user interface for selecting cue points throughout the program, while the broadcast monitor shows the resulting image as the broadcast proceeds.

Figure 21:
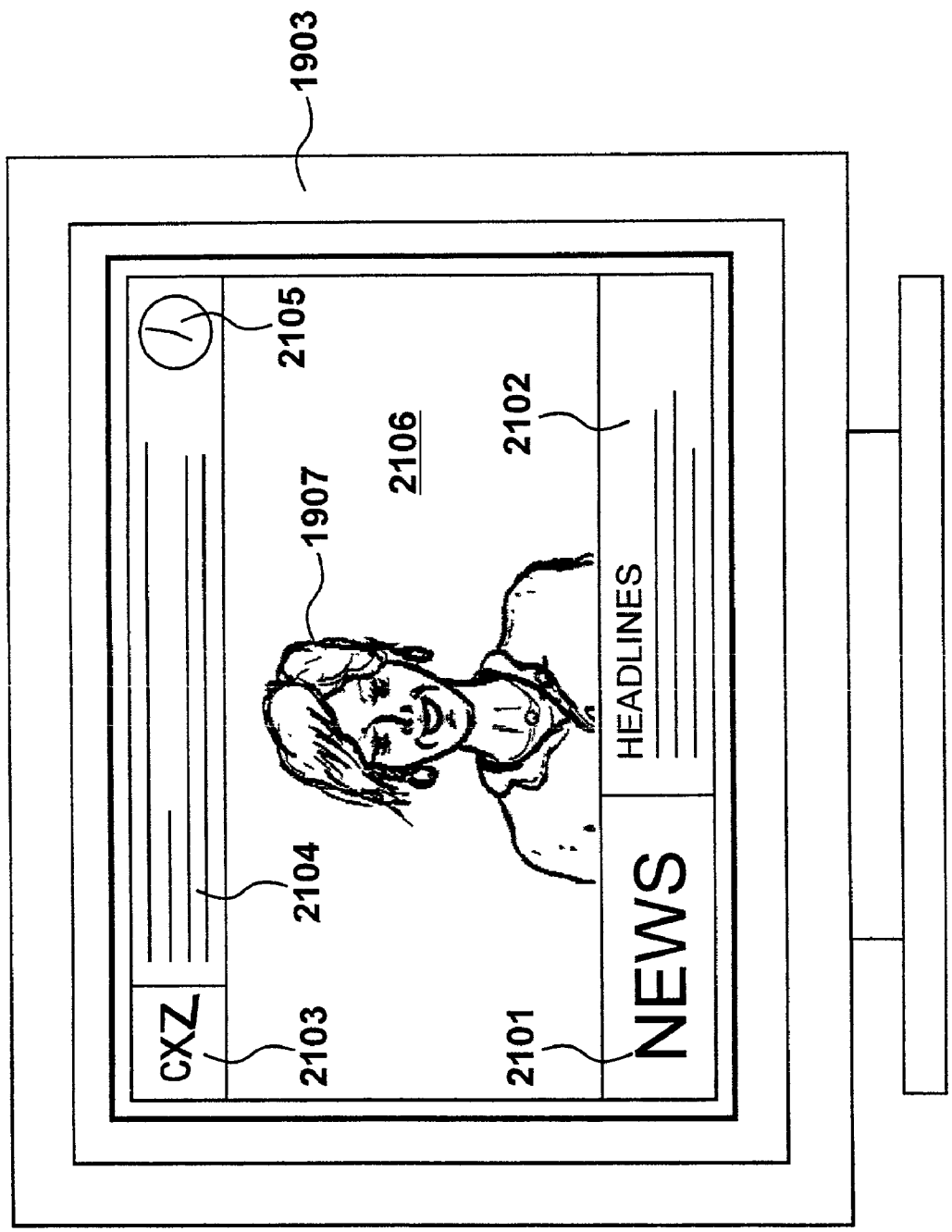
FIGS. 21 to 23 show screenshots of animations as they would be previewed on the broadcast monitor shown in FIG. 19.
Figure 22:
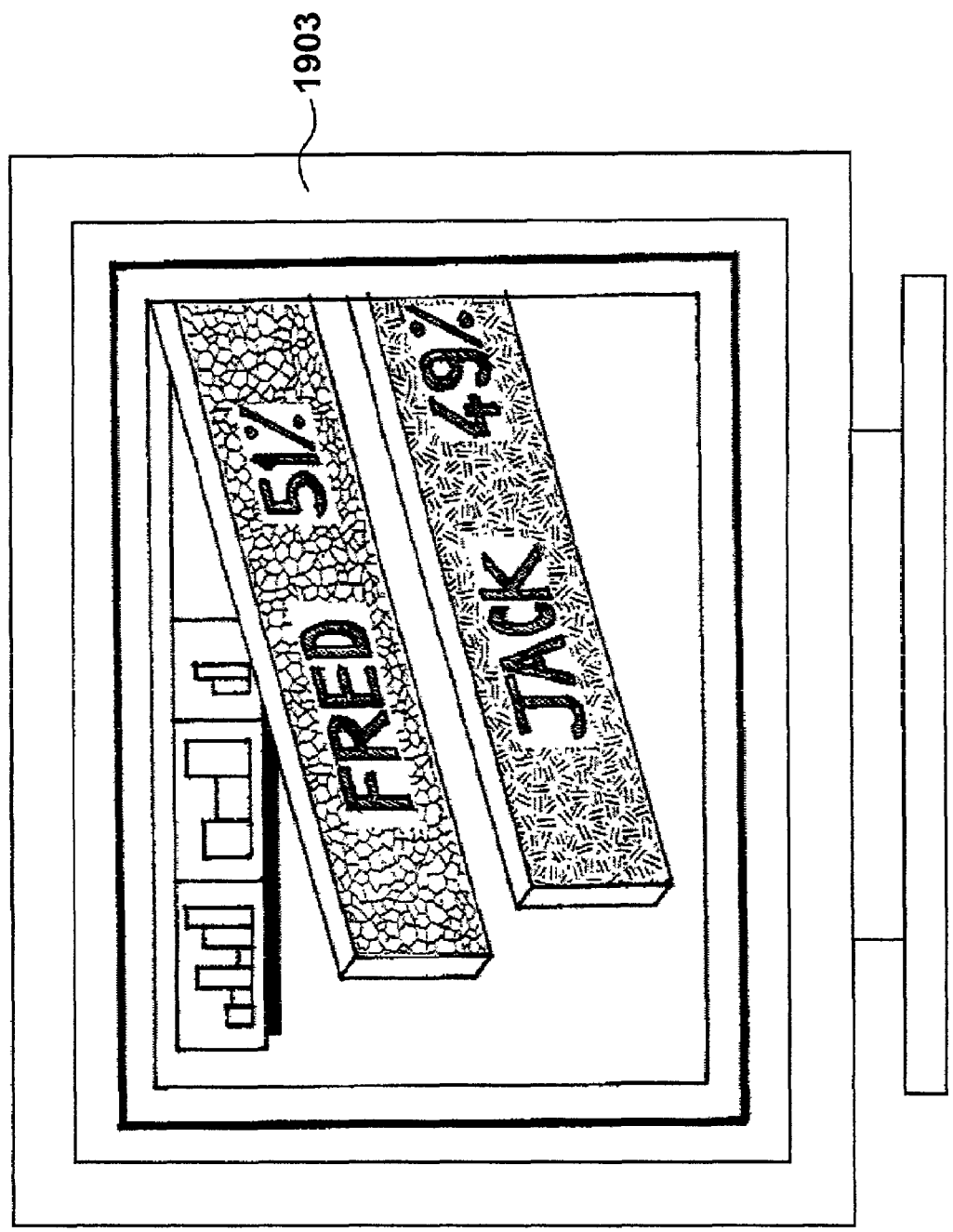
Figure 23:
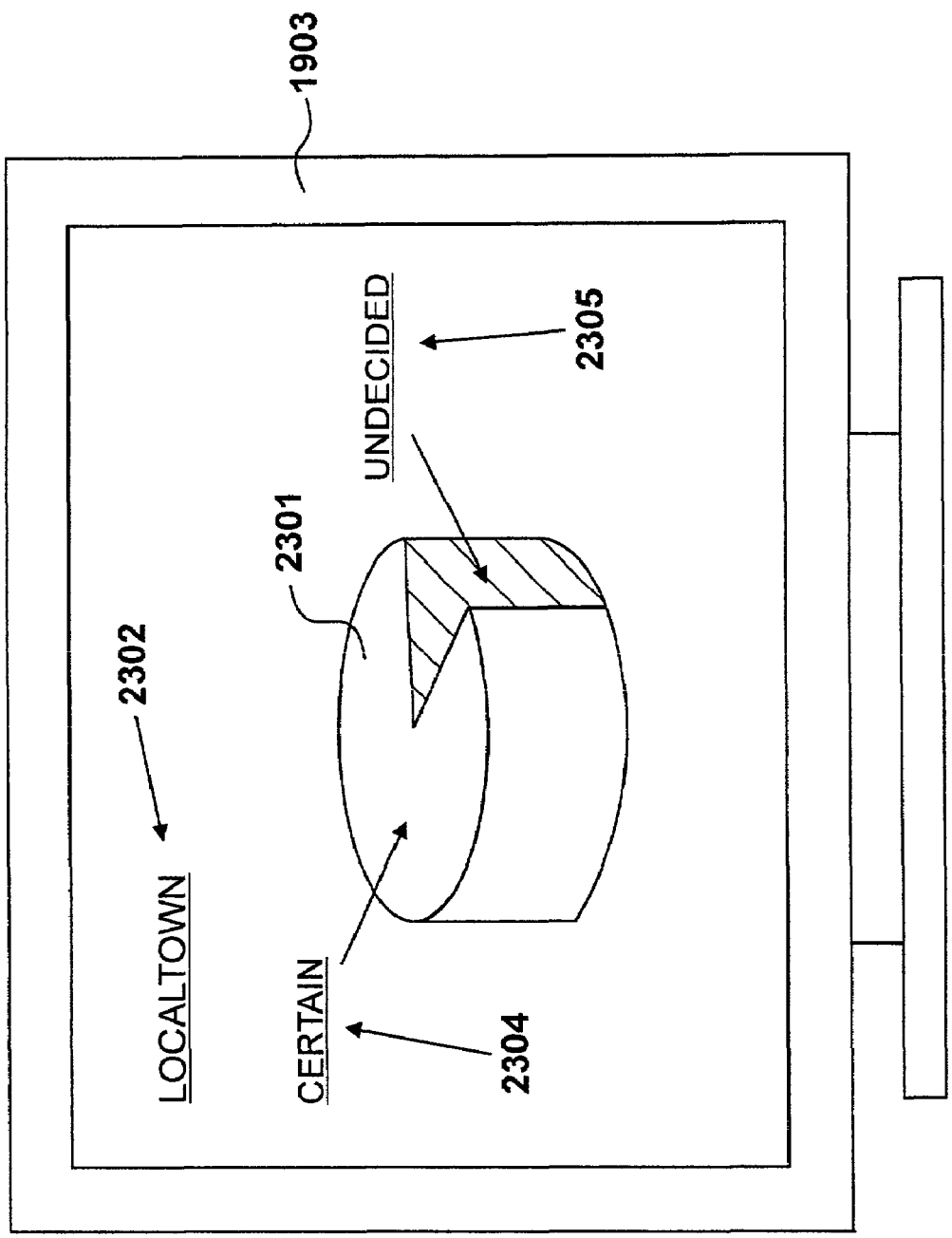

Screenshots of several sections of the news program are shown in FIGS. 21 to 23. In FIG. 21 the main view of the program is shown, including the newsreader 1907 located centrally, with several graphical components 2101 to 2105 superimposed upon the camera image. The blue screen background 1909 has been replaced by a more aesthetically pleasing background 2106. Several of the graphical components 2103 and 2105 are animated, and change their appearance dynamically. Distributor region 2103 contains default objects, and the same is also true of the viewer region 2104. The default objects are created so the broadcaster has some idea as to how the program will look when it eventually gets displayed on a viewer's television set 105.

A typical animation from an election news item is shown in FIG. 22, in which two animated three-dimensional graphs are rendered, against a backdrop of other graphical data. The switch to this scene requires that the digitally generated animated portions of the scene are switched at exactly the same time as the video source. This simultaneous switching is performed by setting a cue point that is triggered automatically, rather than by manual user operation of the keyboard 1904. An automatic trigger can be supplied via a studio automation communications protocol that uses an Ethernet network to synchronise and communicate between the several hardware components of a television studio. For example, the producer can initiate a crossfade between video sources, and have this result in a command to crossfade simultaneously between graphic animations generated by the processing system 1901. A suitable protocol for this type of operation is the Media Object Server (MOS) protocol. Similar synchronisation is performed between rendering performed by the broadcaster 101 and rendering performed by a distributor 102 and a receiver 105. For example, FIG. 22 includes only broadcast regions. There is no separate distribution region or viewer region. A sudden switch to this presentation is provided by synchronisation throughout the animation chain.

In FIG. 23, the animation resulting from the metafile 921 shown in FIGS. 10 and 11 is illustrated. This includes a pie chart 2301, with a name 2302 and labels 2304 and 2305 for each portion. Here it will be noticed that many design details have been predetermined by the originator of the graphic data, such as the size and colour and overall appearance of the pie chart 2301.

The unlocked parameters that were provided in the metadata 721 for editing, are only those that are minimally required for the construction of a news item. This minimises the complexity of generating an animation for a news story— the same basic design can be reused whenever required. If, for example, the producer requires some inaccessible characteristic to be changed, this requirement is passed on to the animation design house 201, and new graphic data and executable graphic file 911 are produced.

The processing system 1901 shown in FIG. 19 is a Silicon Graphics Onyx2™ processing system, details of this system are available from http://www.sgi.com. The components of the processing system 1901 are detailed in FIG. 24. The processing system contains eight main processing modules. Each module comprises four processors 2401, 2402, 2403 and 2404. Each processor is a MIPS™ R12000™ sixty-four bit processor. Each processor has an on-chip primary instruction and data cache, as well as a larger separate secondary cache circuit 2405. Each processing module includes one gigabyte of main memory 2406 and a switch 2407.

The four processors 2401, 2402, 2403 and 2404 are connected together in a symmetric multi-processing (SMP) array, and have equal access to the local memory 2406. The main memories on each of the processing modules are connected to each other via the switches 2407, 2408. All the memory circuits of the modules are combined into a unified addressable space. However, when a processor requires access to an address in memory that is not local, this increases memory access time. This is known as a Non-Uniform Memory Architecture (NUMA). An operating system running on this type of architecture takes account of this non-uniformity of access times and has a process scheduling algorithm that seeks to localise memory access for a running process (or thread) within the same or nearby processing modules.

A total of thirty-two processors is provided in the processing system 1901, and this provides sufficient processing power to render animations of considerable complexity, and to a high level of quality. The availability of this level of processing also ensures that animations will be rendered in real time. Complex designs can be created on processing systems of lower processing capacity, such as the processing system 309 shown in FIG. 3. However, in order to guarantee real time rendering, a more powerful processing system is typically used when generating animations for live broadcast.

In addition to the processing modules, the processing system 1901 also includes a storage module 2411, a graphics module 2412 and an input output module 2413. The storage module 2411 includes a redundant array of inexpensive disks 2414 and a CDROM drive 2415. These are connected to a switch 2416 via a SCSI interface 2417. The graphics module 2412 includes several graphics processing circuits and a switch 2418. The graphics module supplies output video signals to the monitor 1902, the broadcast preview monitor 1903, and in digital form to the broadcast mixing and production stage of the television studio 204. The graphics module 2412 also receives video signals from the camera 1906, which are combined with animation data to generate the broadcast video signals. The input output module 2413 facilitates Ethernet, mouse and keyboard connections. It also is able to receive serial data from the camera 1906, defining camera pan, lens zoom and focus, and so on, for synchronising camera position and characteristics with possible virtual views created as part of an interactive animation, thereby providing a virtual studio. A virtual studio of this type is considered to be generated as a result of rendering an animation with the appropriate interactive characteristics. The input output module 2413 includes a switch 2419, to provide integration with the rest of the modules in the processing system 1901.

In alternative embodiments other processing systems are used which have fewer processors than processing system 1801. For example, in one embodiment a processing system is used which has four processors. However, the larger processing power of system 1801 has benefits when dealing with the large amounts of data involved, at high speeds.

Figure 24:
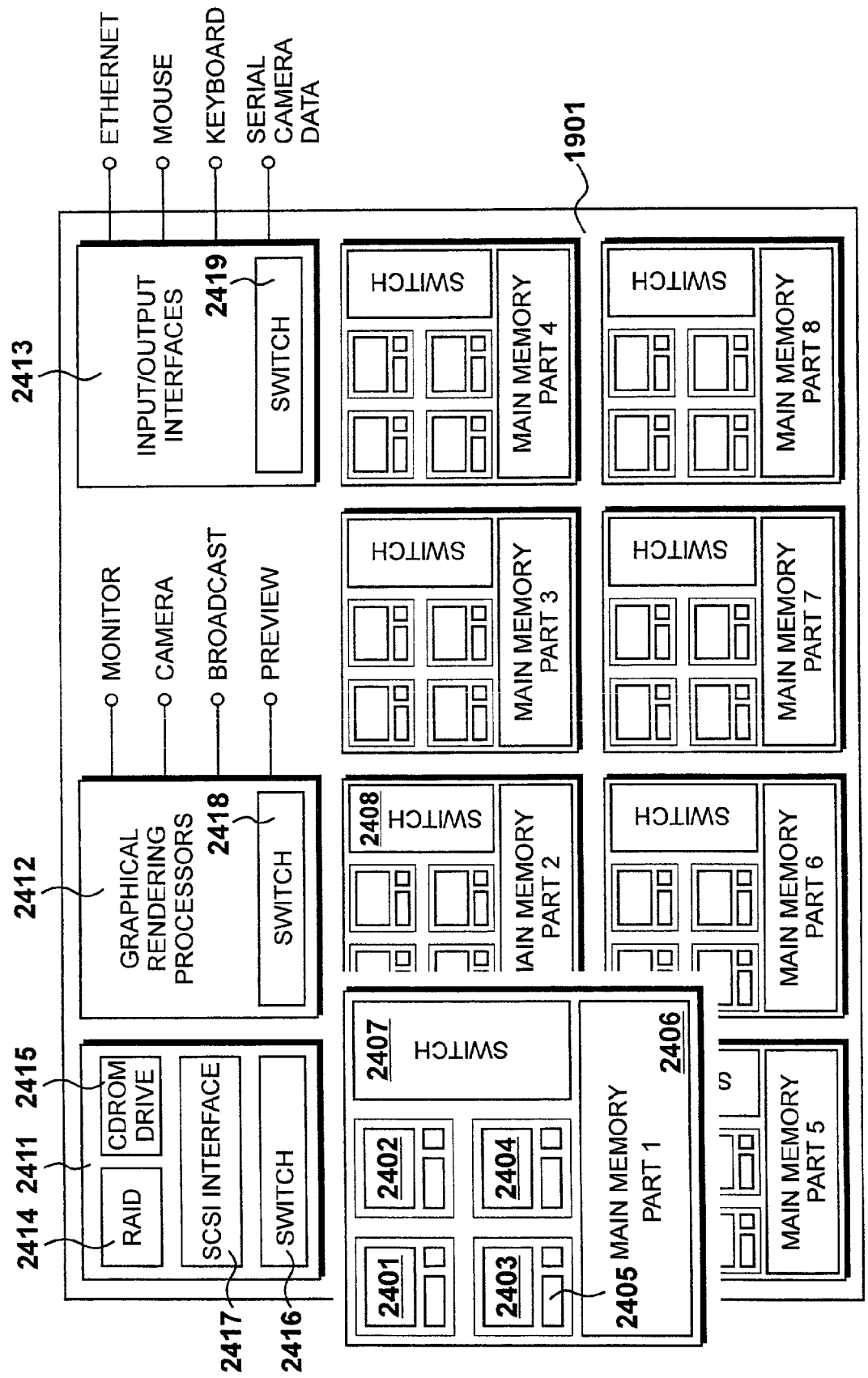
FIG. 24 details components of the processing system shown in FIG. 19, including a distributed main memory.
Figure 25:
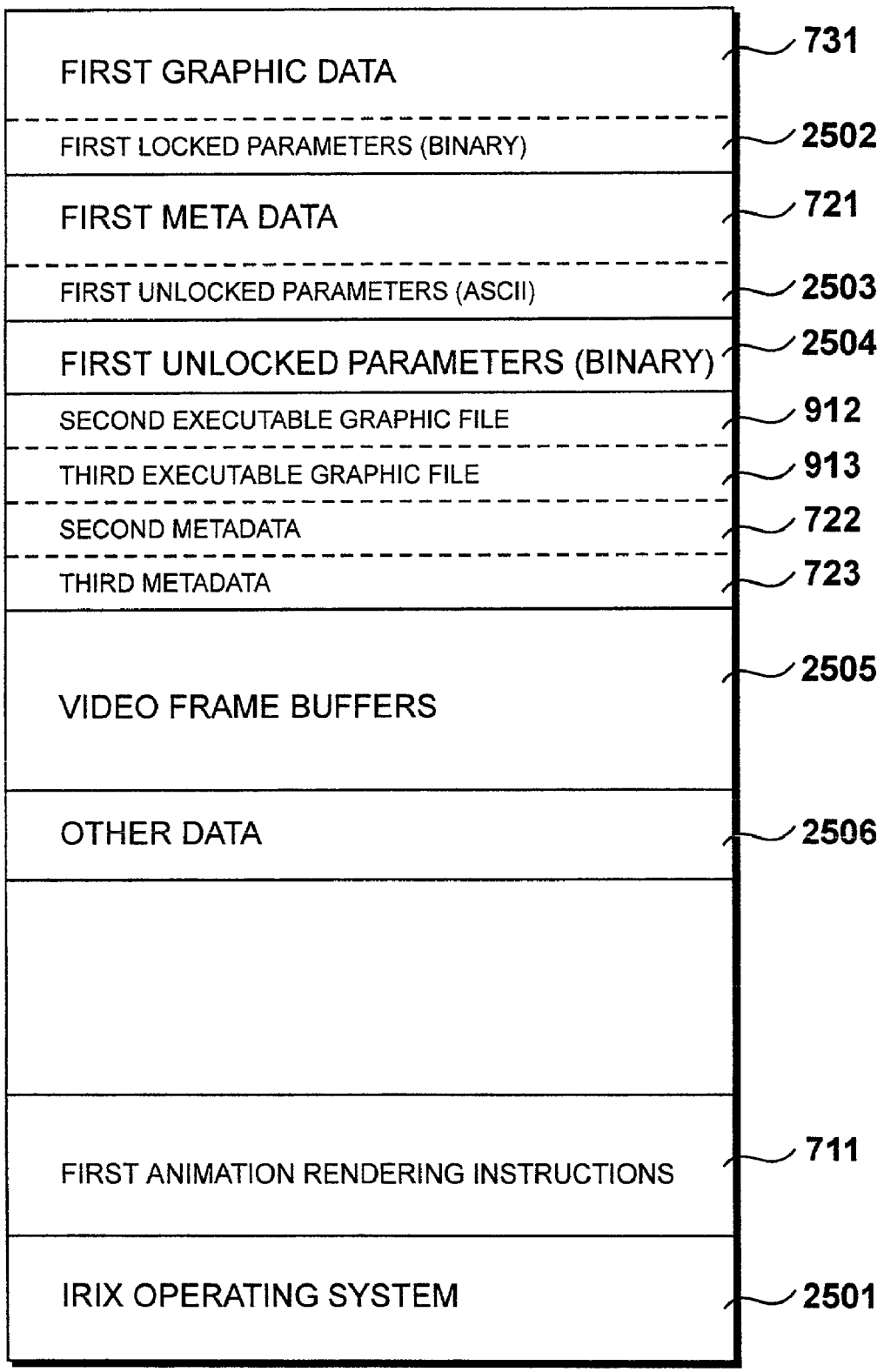
FIG. 25 details the contents of the distributed main memory shown in FIG. 24.

The contents of the main memory of the processing system shown in FIG. 24 are detailed in FIG. 25. An Irix™ operating system 2501 provides common operating system utilities and scheduling for processes. First animation rendering instructions 711 perform rendering of broadcast graphic data 731 in real time. First Graphic data 731 includes locked parameters 2502 in binary format. First metadata 721 includes unlocked parameters 2503 in ASCII format. The unlocked parameters are also stored in binary equivalent form at 2504. The second executable graphic file 912, third executable graphic file 913, second metadata 722 and third metadata 723 are stated for transmission along with the broadcast. Ar 2505 several video frame buffers are provided to ensure efficient pipelining of rendering operations so as to exploit the full potential of the processing capacity of the processing system 1901. Other data includes state data used by the instructions 2501 and 711. The rendering instructions 711 and first graphic data 731 are separated out from the first executable graphic file 911 by the process of executing the graphic file 911.

Figure 26:
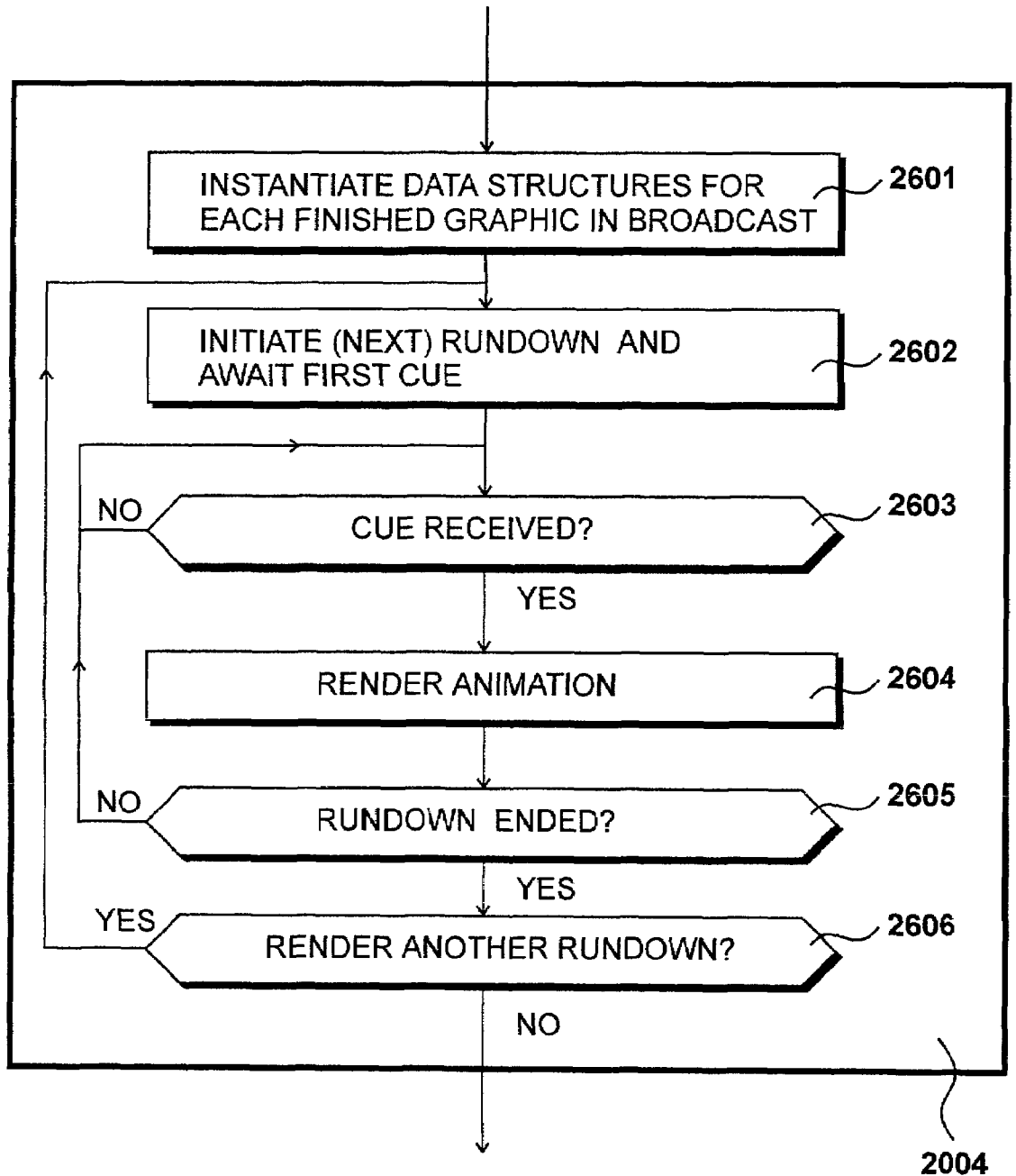
FIG. 26 details the step of running an executable graphic file shown in FIG. 20, including a step of instantiating data structures.

The step 2003 of running an executable graphic file shown in FIG. 20, is detailed in FIG. 26. At step 2601 data structures for each of several finished graphics in a broadcast are instantiated. As stated previously, each metafile has a line 1002 which effectively instantiates a graphic with particular modifiable attributes as defined by the unlocked parameters in the metafile 921. At step 2602 the next rundown is initialised before it is required, and begins waiting for its cue. As mentioned earlier, a rundown is defined by a sequence of graphics, and in the present embodiment, the rundown data also includes the identity of which metafile is to be referenced when rendering each graphic. At step 2603 a question is asked as to whether the cue has been received. If not, this question is asked again. Eventually, once the cue has been received, control is directed to step 2604. A cue may be in the form of a manual user operation, for example pressing a key on the keyboard 1904, or remotely or automatically triggered using the MOS commands over the studio's Ethernet network. At step 2604 the next animation in the sequence is rendered. At step 2605 a question is asked as to whether the rundown is complete. If not, control is directed to step 2603, and the next cue is awaited. When waiting for the next cue, it is likely that rendering will continue, perhaps indefinitely, until the next cue is received. At step 2605, when the current rundown is found to be completed, a question is asked at step 2606 as to whether there is another rundown in the current program sequence. If so, control is directed to step 2602. Alternatively this completes the steps performed when running the executable graphic file 911.

Figure 27:
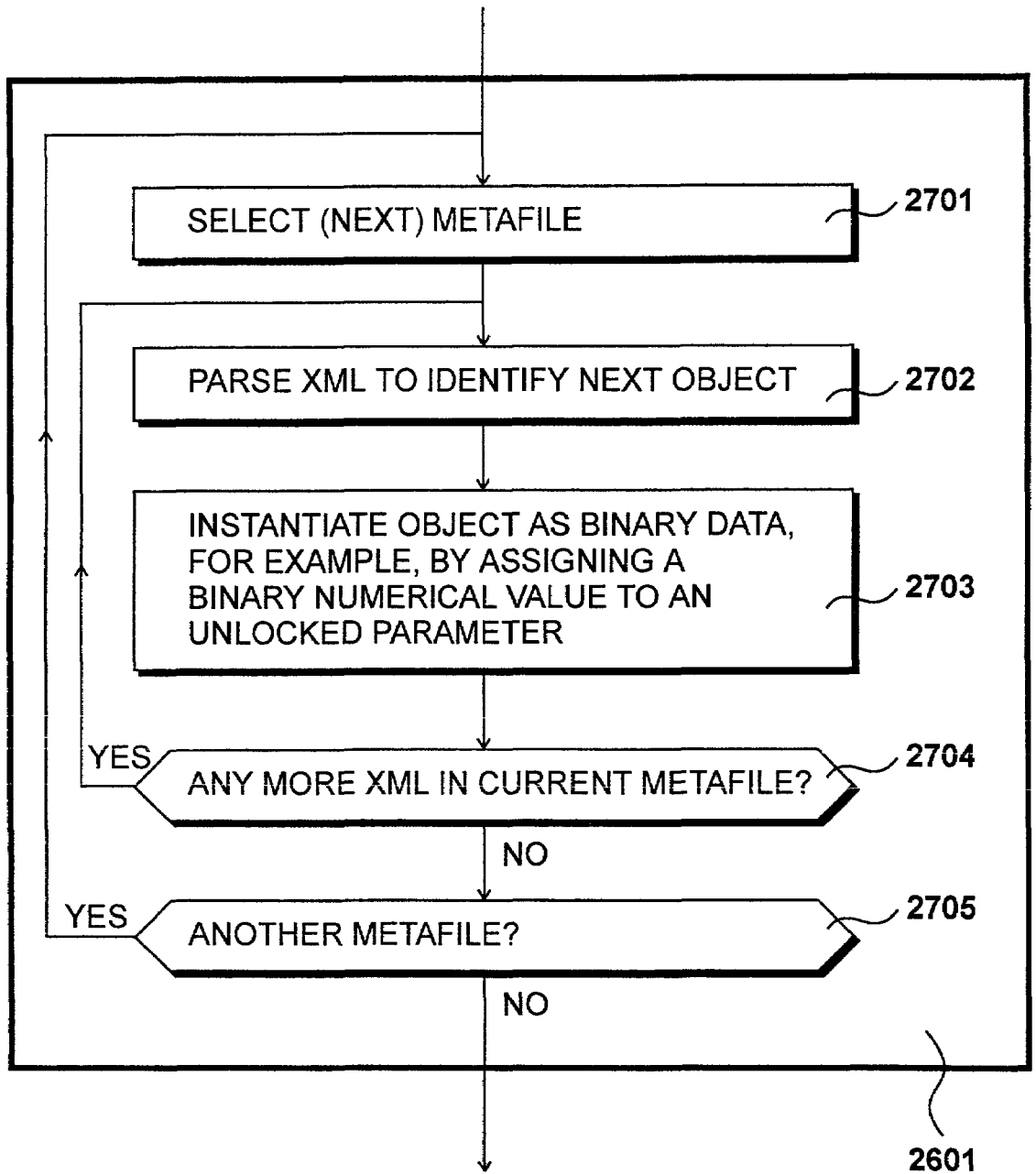
FIG. 27 details the step of instantiating data structures shown in FIG. 26.

The step of instantiating data structures 2601 shown in FIG. 26, is detailed in FIG. 27. At step 2701 a first metafile is selected. Steps 2702 to 2704 then analyse the selected metafile. At step 2702 the ASCII encoded XML is parsed to identify the next parameter object. At step 2703 the object is instantiated as binary data, for example, by assigning a binary numerical value to an unlocked parameter. Step 2703 results in the translation of ASCII formatted unlocked parameters 2503 into their binary equivalents 2504, so that they can be directly accessed during the procedures used when rendering animated graphical components for broadcast. At step 2704 a question is asked as to whether there is any more XML left to parse in the current metafile. If so, control is directed to step 2702, where the next parameter object is selected. Alternatively control is directed to step 2705, where a question is asked as to whether another metafile is available for the current sequence of graphics that are to be rendered during the broadcast. If so, control is directed to step 2701. Alternatively, this completes the sequence of steps required for instantiating data structures for each graphic.

Figure 28:
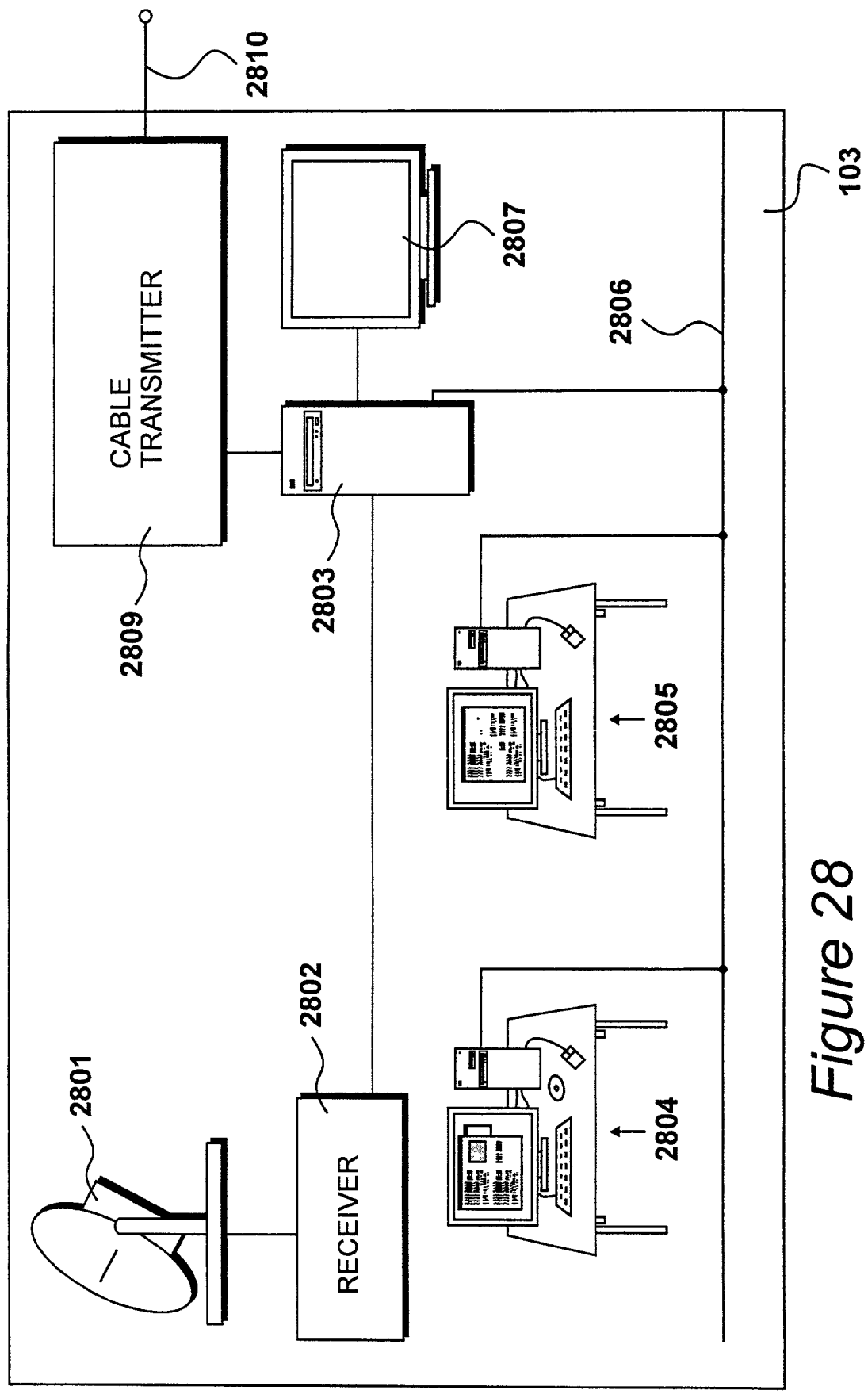
FIG. 28 details the distributing station shown in FIG. 1, including a distribution processing system and a monitor.

The distributor 103 shown in FIG. 1 is detailed in FIG. 28. A satellite receiving antenna 2801 receives broadcast signals from the broadcaster 101 and supplies these to a receiver 2802. The receiver 2802 demodulates the received broadcast signal and generates a high bandwidth stream of data containing images, cues, metafiles and executable graphic files. For example, during the relevant period of the broadcast, this data stream contains image data comprising animation objects which were defined by executable graphic file 911 with reference to new metafile 921 containing modified parameters; and executable graphic files 912 and 913 and respective metafiles 922 and 923. These are supplied as a stream to a distribution processor 2803. Two workstations 2804 and 2805 are connected to the distribution processor 2803 via an Ethernet network 2806. The distribution processor supplies video signals to a distribution monitor 2807, and digitised content signals to a cable transmitter 2809. The cable transmitter encodes, amplifies and transmits the content signals to cable customers via a cable network connection 2810.

Figure 29:
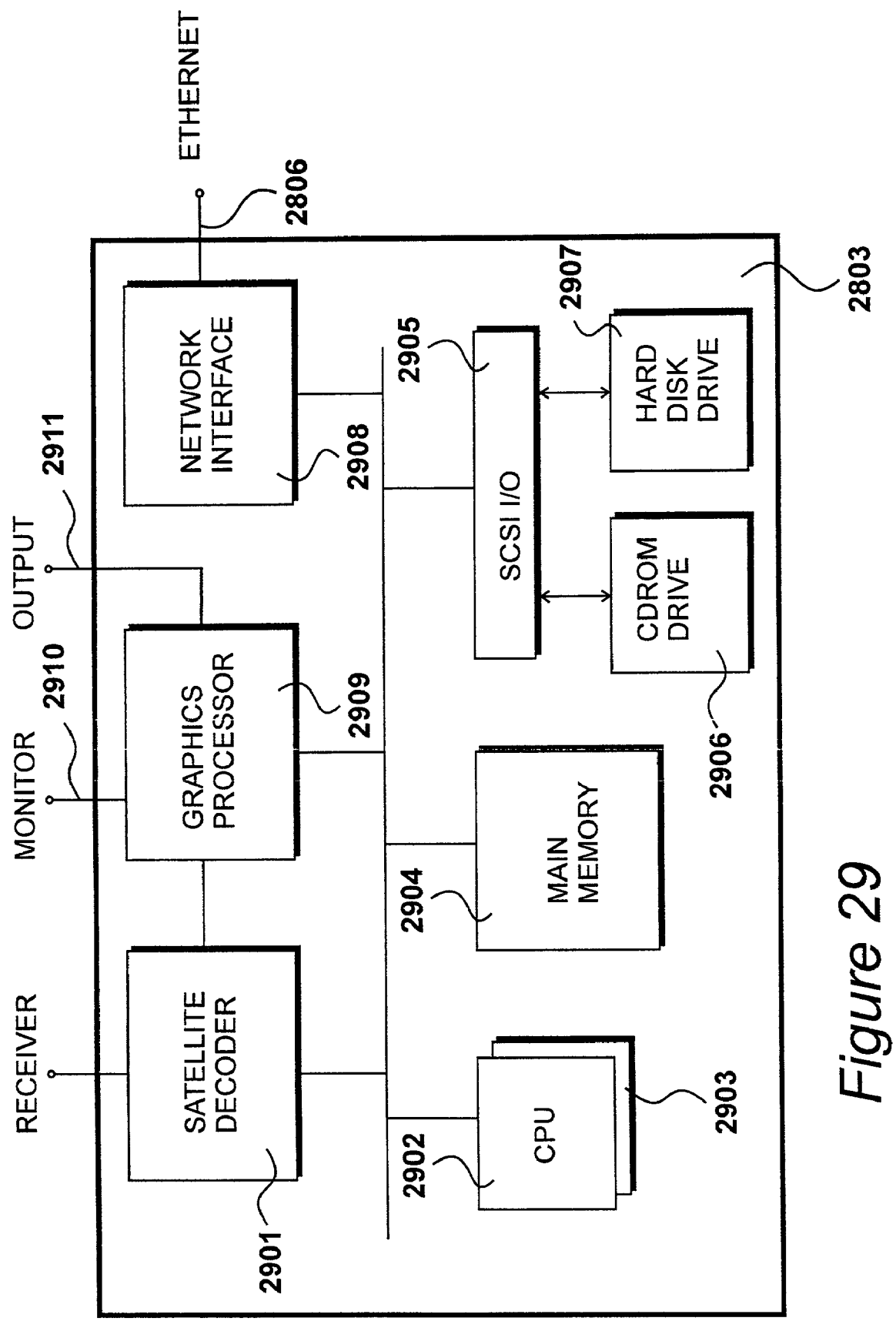
FIG. 29 details hardware components of the distribution processing system shown in FIG. 28, including a main memory.

The distribution processor 2803 shown in FIG. 28 is detailed in FIG. 29. A satellite decoder 2901 receives the stream of digital data from the receiver 2802, and separates out the various types of data that are contained within it. Processing is provided by a pair of Intel Pentium™ III processors 2902 and 2903, both running at 1 GHz, and configured to perform symmetric multi processing (SMP). A main memory 2904 stores instructions and data required for distribution processing. A SCSI input output interface 2905 facilitates connections to a CDROM drive 2906 and a hard disk drive 2907. A network interface 2908 provides a connection to the network 2806 shown in FIG. 28. A graphics processor 2909 receives broadcast image data directly from the satellite decoder 2901. The graphics processor is also able to receive rendering commands from the two processors 2902 and 2903. The graphics processor combines the broadcast image data with cumulatively rendered animation objects, and supplies resulting images to the monitor 2807 via an analogue connection 2910. For example, when second animated objects defined by executable graphic file 912 and metadata 922 are rendered, these are combined with the broadcast image data which includes the animation objects defined by executable graphic file 911 and metafile 921. A stream of high bandwidth data, including the modified image data, an executable graphic file, such as 913, and metadata for use by a viewer, such as metafile 923, is supplied to the cable transmitter 2809 via a connection 2911 from the graphics processor 2909. In addition to performing rendering, the graphics processor receives additional data from the processors 2902 and 2903 and encodes these along with the newly generated image data, as part of the stream that is sent to the cable transmitter 2809.

Figure 30:
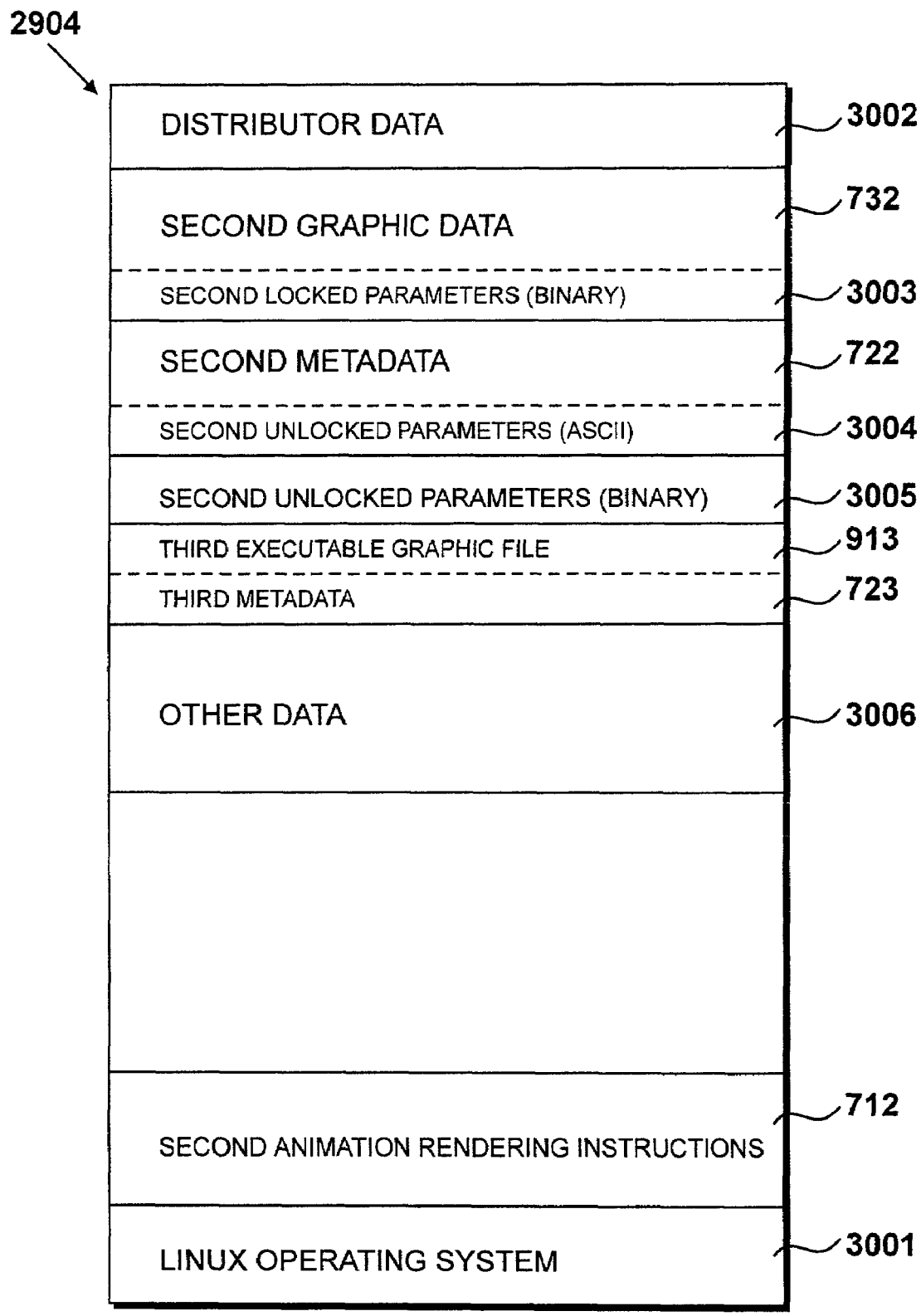
FIG. 30 details contents of the main memory shown in FIG. 29.

The distribution processor's main memory 2904, shown in FIG. 29, is detailed in FIG. 30. At 3001 a Linux™ operating system provides common system functionality. At 712, second animation rendering instructions are provided for cumulative rendering of the distribution part of the overall animation. Distributor data 3002 defines characteristics unique to the distributor 103, including data such as a two-dimensional graphical logo for the distributor, and also data for advertisements.

Second graphic data 732 includes locked parameters 3003 in binary format. Second metadata 722 includes unlocked parameters 3004 in ASCII format. The unlocked parameters are also stored in binary equivalent form at 3005. The third executable graphic file 913 and third metadata 723 are stored for inclusion with the cable transmission. Other data 3006 includes state data used by the instructions 3001 and 712. The rendering instructions 712 and second graphic data 732 are separated out from the executable graphic file 912, received from the broadcaster 101, by the process of executing the executable graphic file 912.

Figure 31:
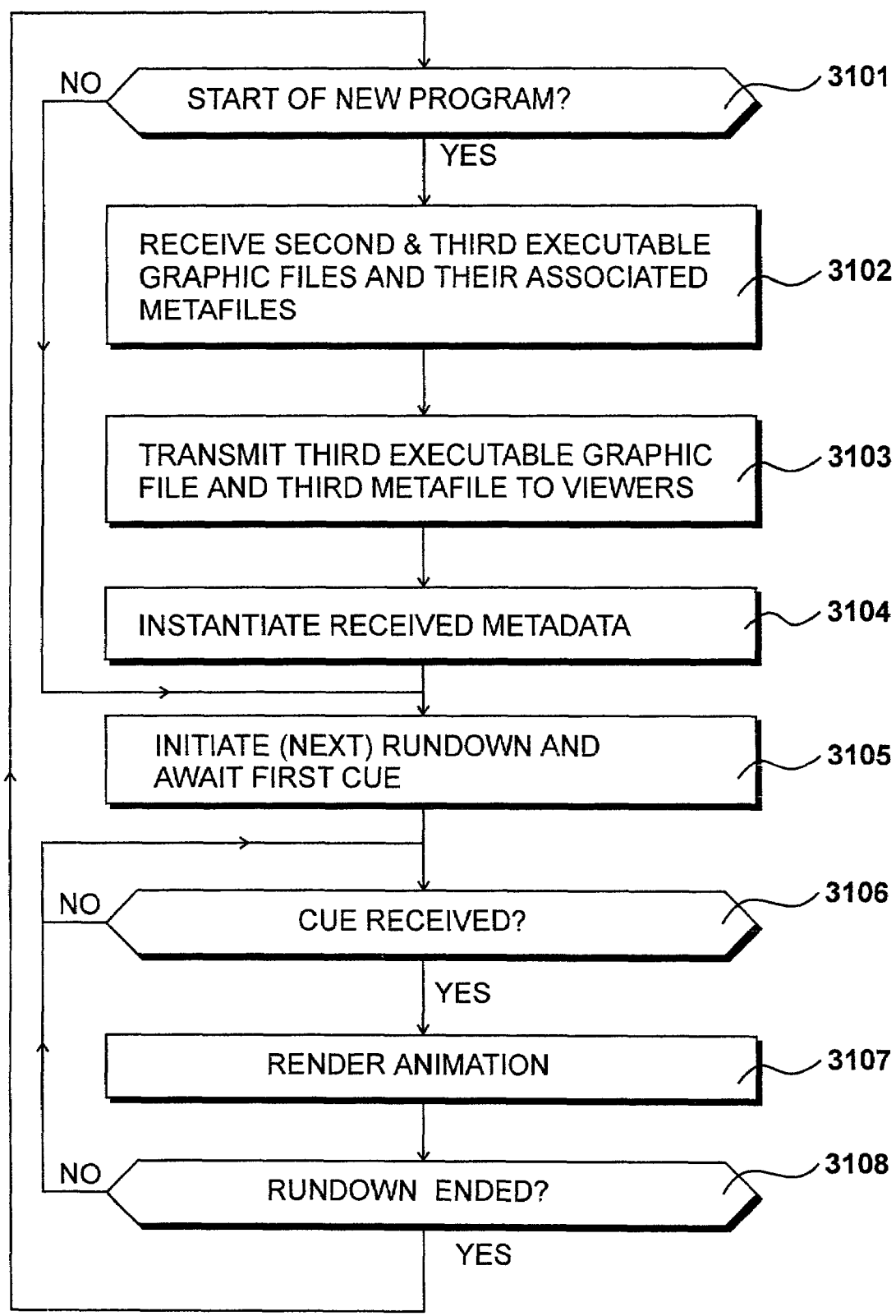
FIG. 31 details steps performed by the processing system shown in FIG. 28, including a step of instantiating received metadata.

Operations of the distribution processor 2803 shown in FIG. 28 are detailed in FIG. 31. At step 3101 a question is asked as to whether a new television program broadcast has begun. If not, control is directed to step 3105. Alternatively, control is directed to step 3102 where second and third executable graphic files 912 and 913 and their associated metafiles 922 and 923 are received and loaded into main memory 2904. This results in the data structure shown in FIG. 30. The operating system 3001 is configured to perform automatic loading of new executable instructions whenever they are provided from the satellite decoder 2901. Loading of the second executable graphic file 912, results in separation of its contents into the second animation rendering instructions 712 and the second graphic data 732 as shown in FIG. 30. The third executable graphic file 913 remains intact and is passed on for transmission to viewers 205 at step 3103. Also at step 3103, the third metadata 723 is transmitted to viewers as part of the distribution data stream transmitted over the cable network.

At step 3104 data structures for received second metadata 722 are instantiated. At step 3105 the next rundown is initialised before it is required, and begins waiting for its cue. At step 3106 a question is asked as to whether the cue has been received. If not, this question is asked again. Eventually, once the cue has been received, control is directed to step 3107. A cue is in the form of a synchronisation cue transmitted as part of the broadcast data stream and received by the satellite receiver 2802, and separated out and identified as a cue by the satellite decoder 2901. At step 3107 the animation is rendered. At step 3108 a question is asked as to whether the rundown has ended. If not, control is directed to step 3106, and the next cue is awaited. When waiting for the next cue, rendering continues until the next cue is received. If the current rundown has ended, control is directed to step 3101, and the steps for distribution processing are repeated.

Figure 32:
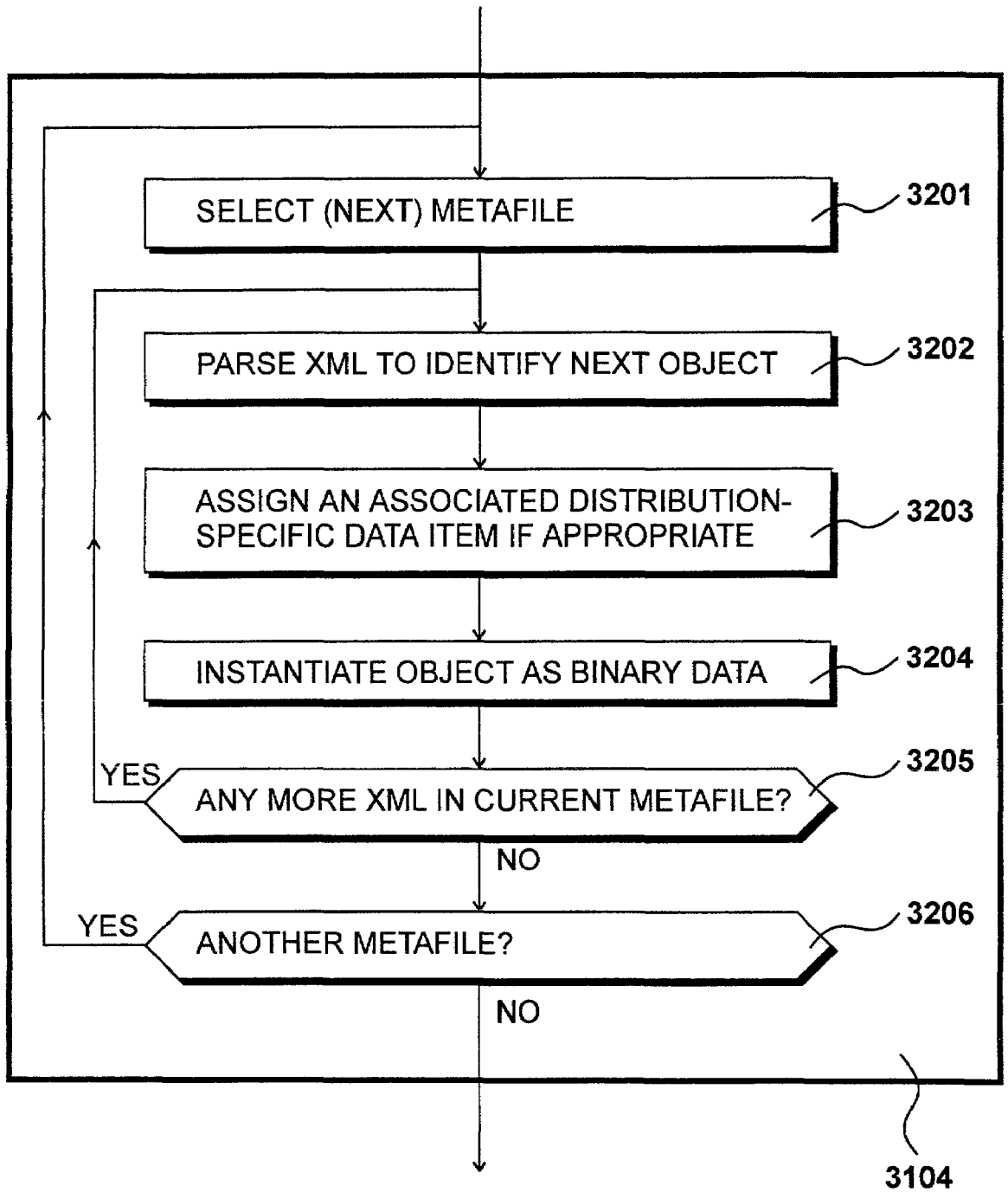
FIG. 32 details the step of instantiating received metadata shown in FIG. 31.

The step 3104 of instantiating data structures for received second metadata shown in FIG. 31, is detailed in FIG. 32. It is possible that several metafiles containing second metadata 722 have been received, and each of these is analysed in turn. At step 3201 a received metafile is selected. Steps 3202 to 3204 then analyse the selected metafile. At step 3202 the ASCII encoded XML is parsed to identify the next parameter object. At step 3203 the object is assigned an associated distribution-specific data item, if appropriate. The distribution specific data item is located in the distributor data 3002, and for example may consist of a pointer to a graphical logo for the distributor.

At step 3204 the parameter object is instantiated as binary data, for example, by assigning a binary address value for the graphical logo. Step 3204 results in the translation of ASCII default unlocked parameters 3004 into specific non-default equivalents 3005. These are then directly accessed during the procedures for cumulative rendering of animated graphical components for distribution. At step 3205 a question is asked as to whether there is any more XML left to parse in the current metafile. If so, control is directed to step 3202, where the next parameter object is selected. Alternatively control is directed to step 3206, where a question is asked as to whether another metafile is available for the current sequence of rundowns that are to be rendered during distribution of the broadcast. If so, control is directed to step 3201. Alternatively, this completes the sequence of steps required for instantiating data structures for distribution processing.

Figure 33:
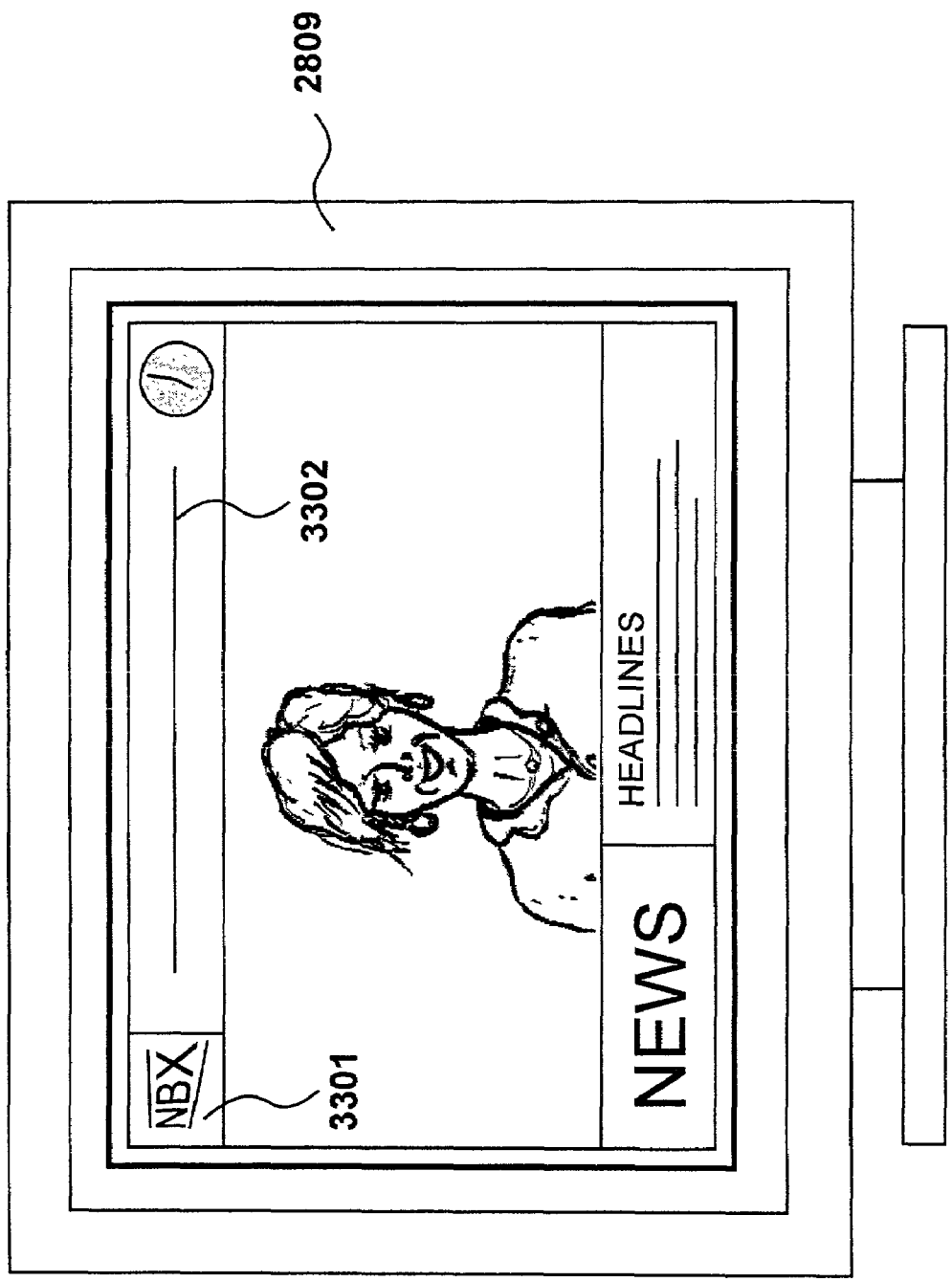
FIG. 33 shows a screenshot of an image as it would appear on the monitor shown in FIG. 28.

An image resulting from distribution processing is shown in FIG. 33, as it would appear on the distributor monitor 2809. The distributor region 3301 in the top left now includes the distributor's own logo, which may be animated. This part of the screen is different for each distributor 102, 103 and 104. The viewer region 3302 is still at a default setting. The animation designer can provide each distributor with the same set of animated objects, which can then be customised by modification of second metadata 722, without the need to access the more complex graphic data 732. For example, a distributor logo can be texture mapped to an animated rotating surface. Furthermore, it will be highly advantageous to the owner of the copyright of the animation design components if these cannot be directly accessed by the broadcaster, 101, a distributor 102, 103, 104, or a viewer 105 to 110. Animations can be customised according to the needs of the broadcaster 101, or a distributor 102, without the need to provide them will full access to the graphic data. Distribution of the graphic data as part of an executable graphic file 912 prevents the distributor from being able to directly modify the graphic data. Graphic data in binary format 3003 is scrambled to ensure that the effort required to gain access to the contents would be greater than the cost of obtaining legitimate access.

The final stage in the transmission chain, is the transmission of distributed program contents over a cable network to receivers 105 to 110. The major components of a receiving set 105 are detailed in FIG. 34. A cable connection is made to a decoder 3401, which demodulates and decodes signals from the distributor 103. The decoder 3401 supplies resulting image signals directly to a graphics processor 3402, which also performs audio processing. The decoder also supplies data signals to a central processing unit 3403. The central processing unit (CPU) is an ARM10™ processor, available from ARM Limited of Cambridge, England. Technical details of this processor are available at http://www.arm.com. A main memory 3404 stores dynamically held instructions and data, and comprises thirty-two megabytes of dynamic RAM. A flash memory 3405 provides thirty-two megabytes of non-volatile data and instruction storage. A display and loud-speakers 3406 receive control signals from the CPU 3403 and digital streams of images and audio data from the graphics and audio processor 3402, and renders these as images and sounds on a cathode ray tube and loudspeakers. A remote control and data input interface circuit 3407 receives remote control signals and user input signals from other forms of input device, possibly including a remote keyboard for alpha-numeric input. A modem 3408 provides a connection, possibly via the cable distributor 103, to the Internet, so as to enable Internet browsing and also email communications.

In the present embodiment the receivers such as receiver 105 are television sets, but in other embodiments the television receivers may be other suitable apparatus, such as personal computers having an appropriate video card for receiving broadcast digital television signals, or television sets used in co-operation with a "set top box" for receiving broadcast digital television signals.

Figure 34:
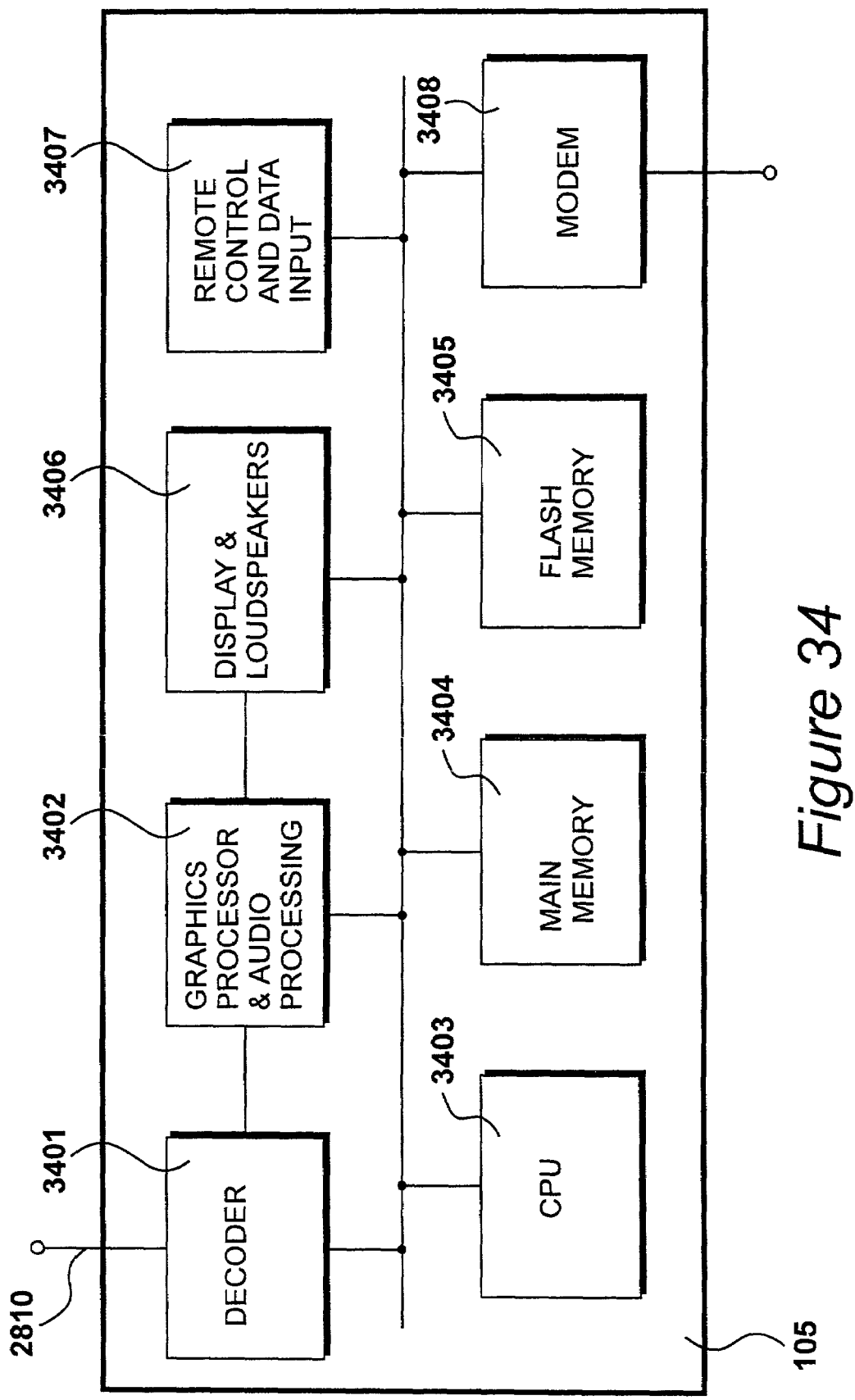
FIG. 34 details hardware components of the viewer's television receiver shown in FIG. 1. Including a main memory.
Figure 35:
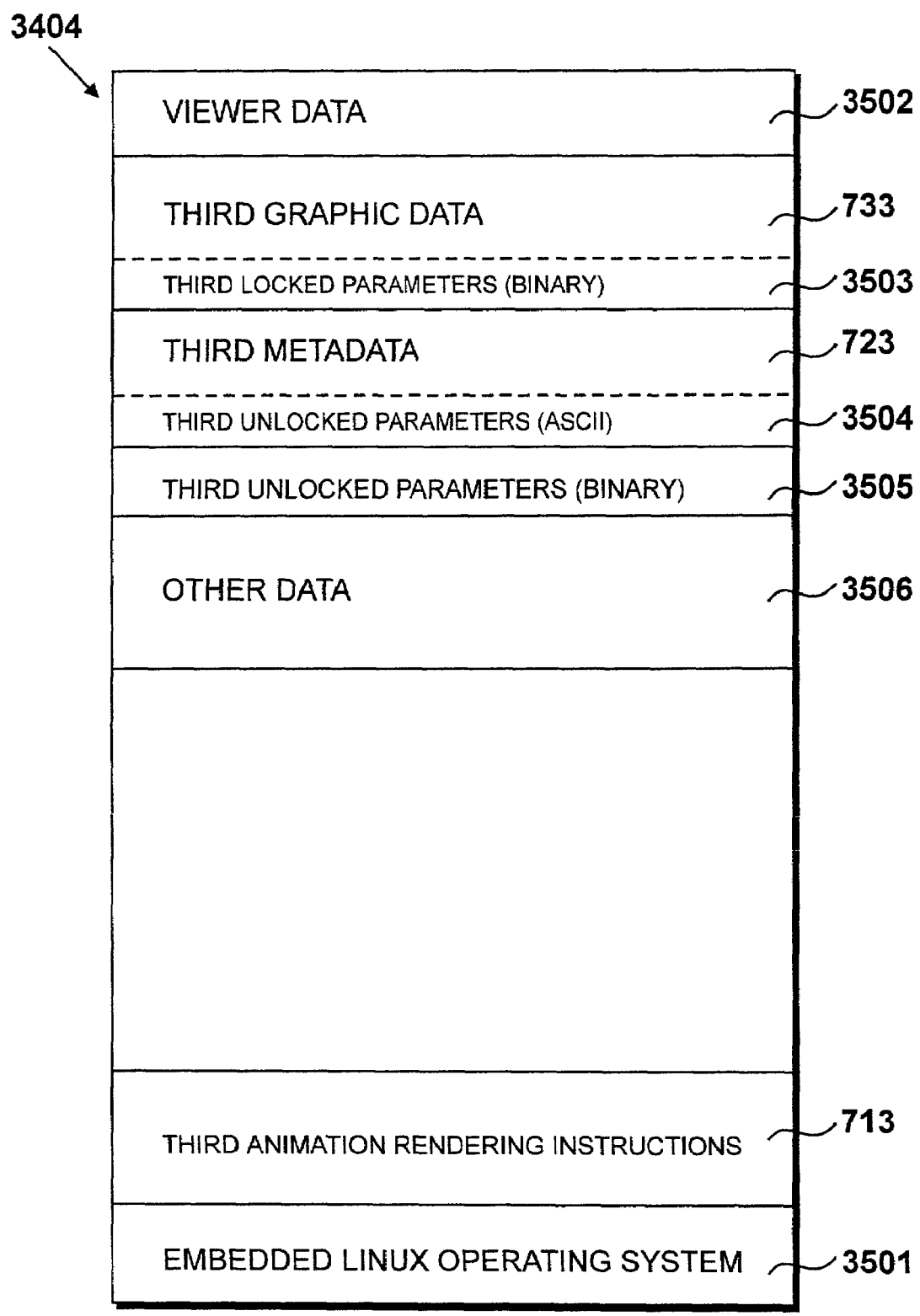
FIG. 35 details the contents of the main memory shown in FIG. 34.

The receiver processor's main memory 3404, shown in FIG. 34, is detailed in FIG. 35. At 3501 an embedded Linux™ operating system provides common operating system functionality. Third animation rendering instructions 713 facilitate cumulative rendering of the viewer's part of the overall animation. Viewer data 3502 defines animation characteristics unique to the viewer 103, including data such as the score of a football match that the viewer has expressed an interest in.

Third graphic data 733 includes locked parameters 3503 in binary format. Third metadata 723 includes unlocked parameters 3504 in ASCII format. The unlocked parameters are also stored in binary equivalent form at 3505. Other data includes state data used by the instructions 3501 and 713. The rendering instructions 713 and third graphic data 733 are separated from the executable graphic file 913, received from the distributor 103, by the process of executing the executable graphic file 913.

Figure 36:
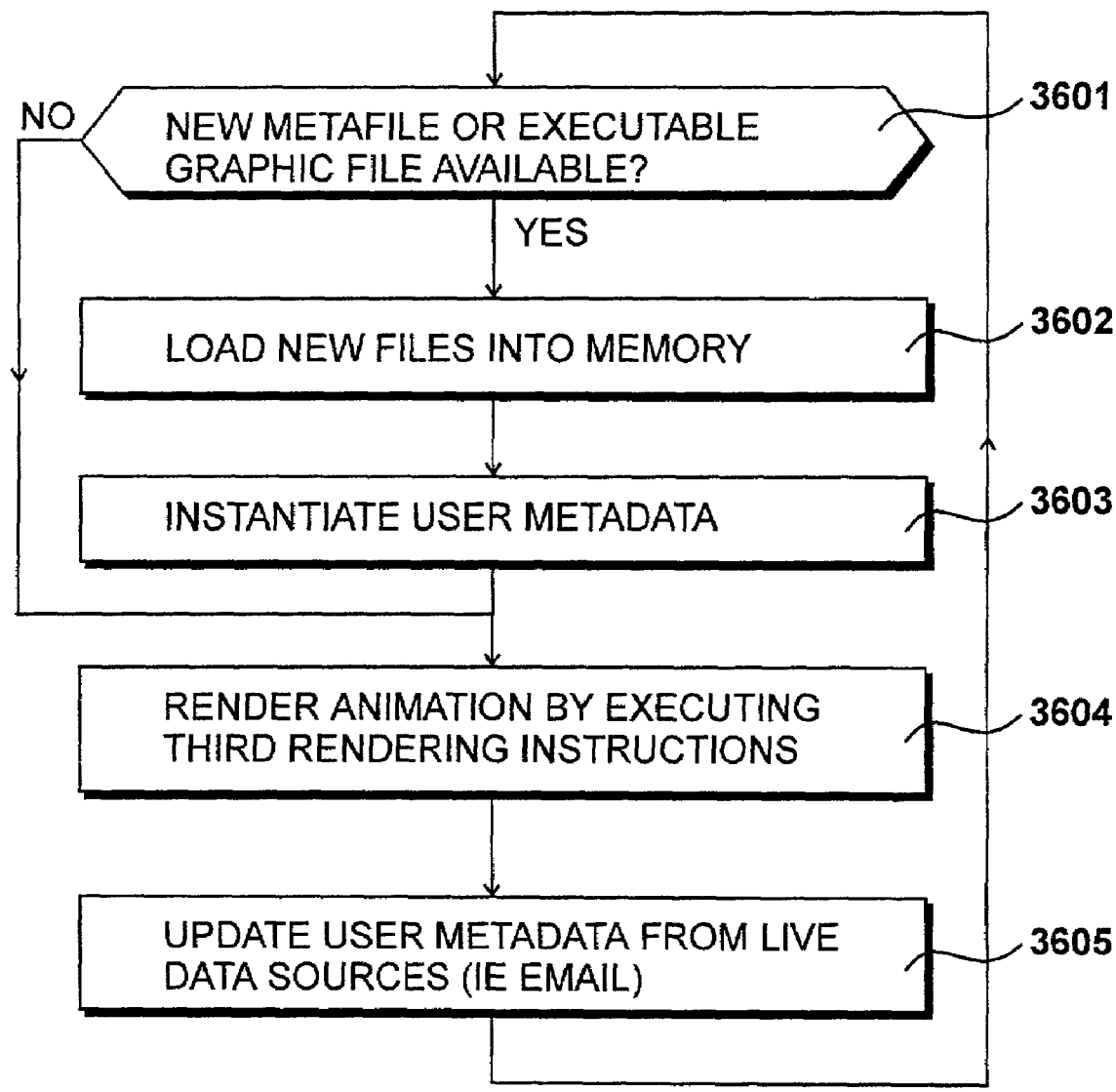
FIG. 36 summarises steps performed by the receiver shown in FIG. 34, including a step of instantiating data structures and a step of updating user metadata.

Operations of the receiver processor 3403 shown in FIG. 34 are detailed in FIG. 36. At step 3601 a question is asked as to whether a new metafile or executable graphic file has been received from the distributor 103. If not, control is directed to step 3604. Alternatively, control is directed to step 3602 where metadata 723 and or an executable graphic file 913 are received and loaded into main memory 3404. This results in the data structure shown in FIG. 35. The operating system 3501 is configured to perform automatic loading of new executable instructions 913 whenever they are provided from the cable decoder 3401. Loading of the third executable graphic file 913, results in separation of its contents into the third animation rendering instructions 713 and the third graphic data 733 as shown in FIG. 35.

At step 3603 data structures for received third metadata 723 are instantiated. At step 3604 the viewer components of the animation are rendered. At step 3605 user metadata structures are updated from live data sources, such as email or sports scores via the Internet, before the process returns to step 3601.

Figure 37:
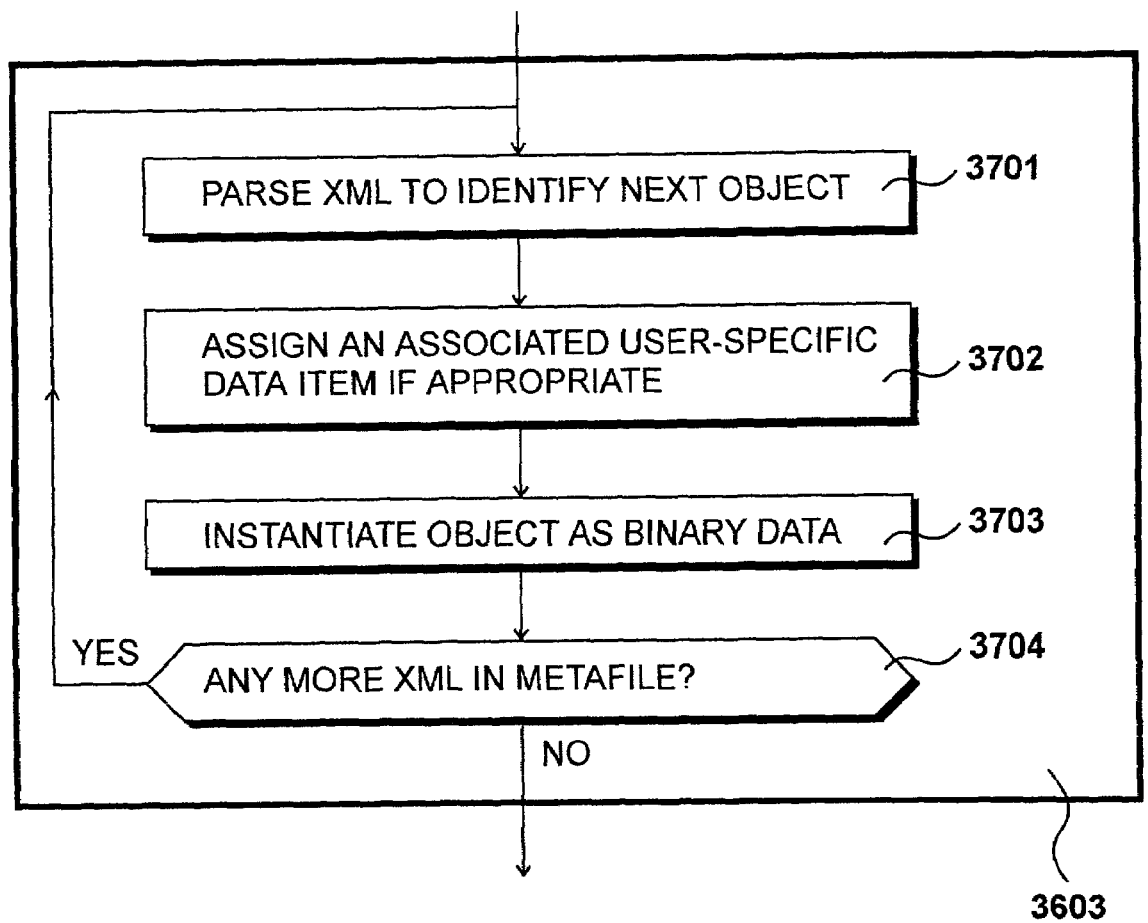
FIG. 37 details the step of instantiating data structures shown in FIG. 36.

The step 3603 of instantiating data structures for received third metadata shown in FIG. 36, is detailed in FIG. 37. At step 3701 the ASCII encoded XML is parsed to identify the next parameter object. At step 3702 the object is assigned an associated viewer-specific data item, if appropriate. The viewer-specific data item is located in the viewer data 3502, and for example may consist of a pointer to information about a sports score.

At step 3703 the parameter object is instantiated as binary data, for example, by assigning a binary address value for pointer to the sports score. Step 3703 results in the translation of ASCII default unlocked parameters 3504 into specific non-default equivalents 3505. These are then directly accessed during the procedures for cumulative rendering of animated graphical components for the viewer's receiver 105. At step 3704 a question is asked as to whether there is any more XML left to parse in the current metafile. If so, control is directed to step 3701, where the next parameter object is selected. Alternatively, this completes the sequence of steps required for instantiating data structures for receiver processing.

Figure 38:
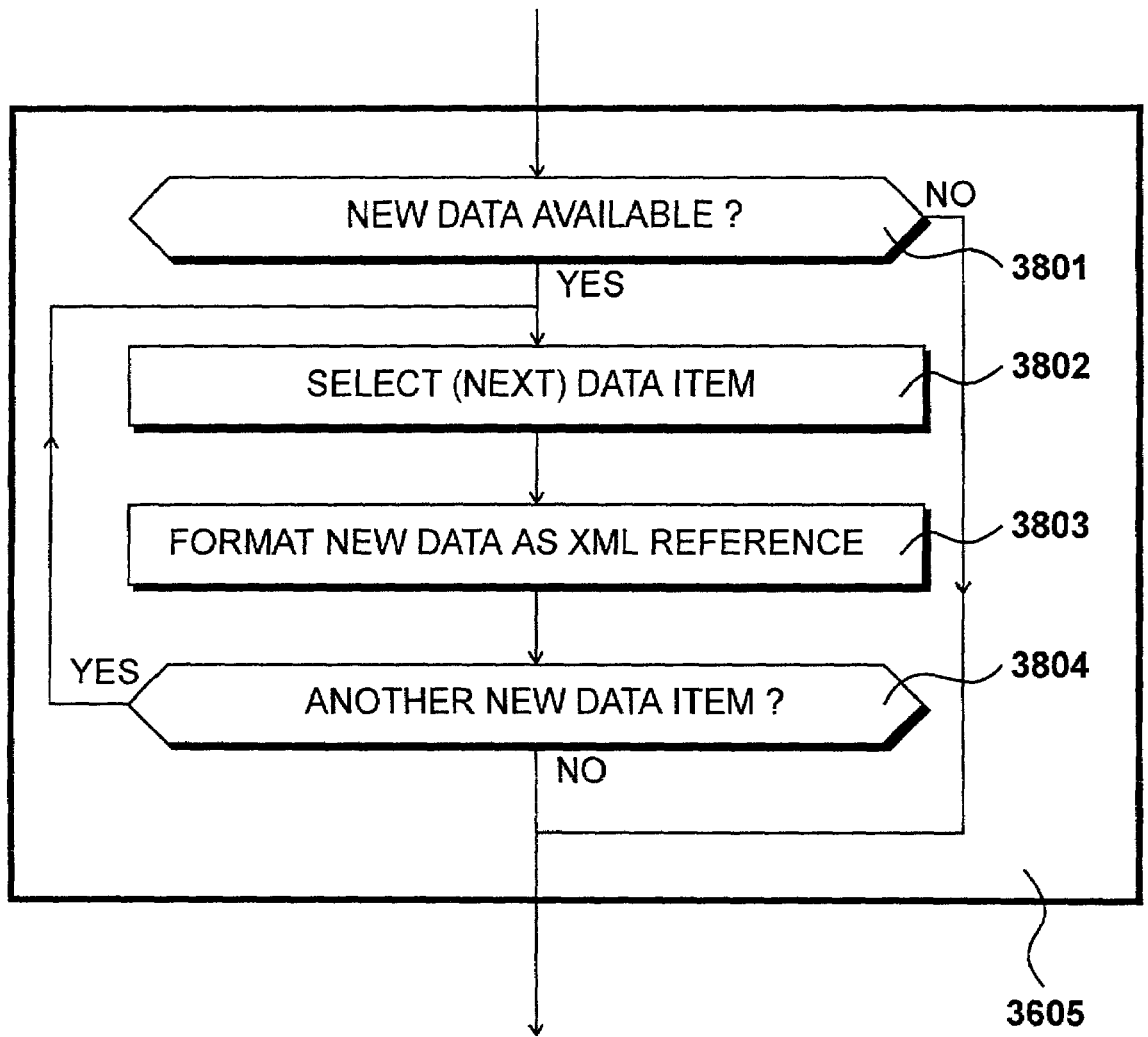
FIG. 38 details the step of updating user metadata shown in FIG. 36.

The step 3605 of updating user metadata from live data sources, shown in FIG. 36, is detailed in FIG. 38. At step 3801 a question is asked as to whether there is any new data available. If not, no action is taken. Alternatively, control is directed to step 3802. At step 3802 the first new or changed data item is selected. At step 3803 the new or changed data is formatted so that it can be referenced by an XML-derived parameter object. At step 3804 a question is asked as to whether there is another new or changed data item that requires updating. If so, control is directed to step 3801. Alternatively, this completes the new user data processing. Steps 3801 to 3804 are used to dynamically update changing information that is specific to a user. For example, a user may wish to keep track of changing scores in a football match. A link to an Internet site via the modem 3408 provides new data whenever the score changes. Steps 3801 to 3804 ensure that any references to such user specific data, that are intended for cumulative rendering as part of the overall animation, result in immediate update on the screen of the viewer's television set.

Figure 39:
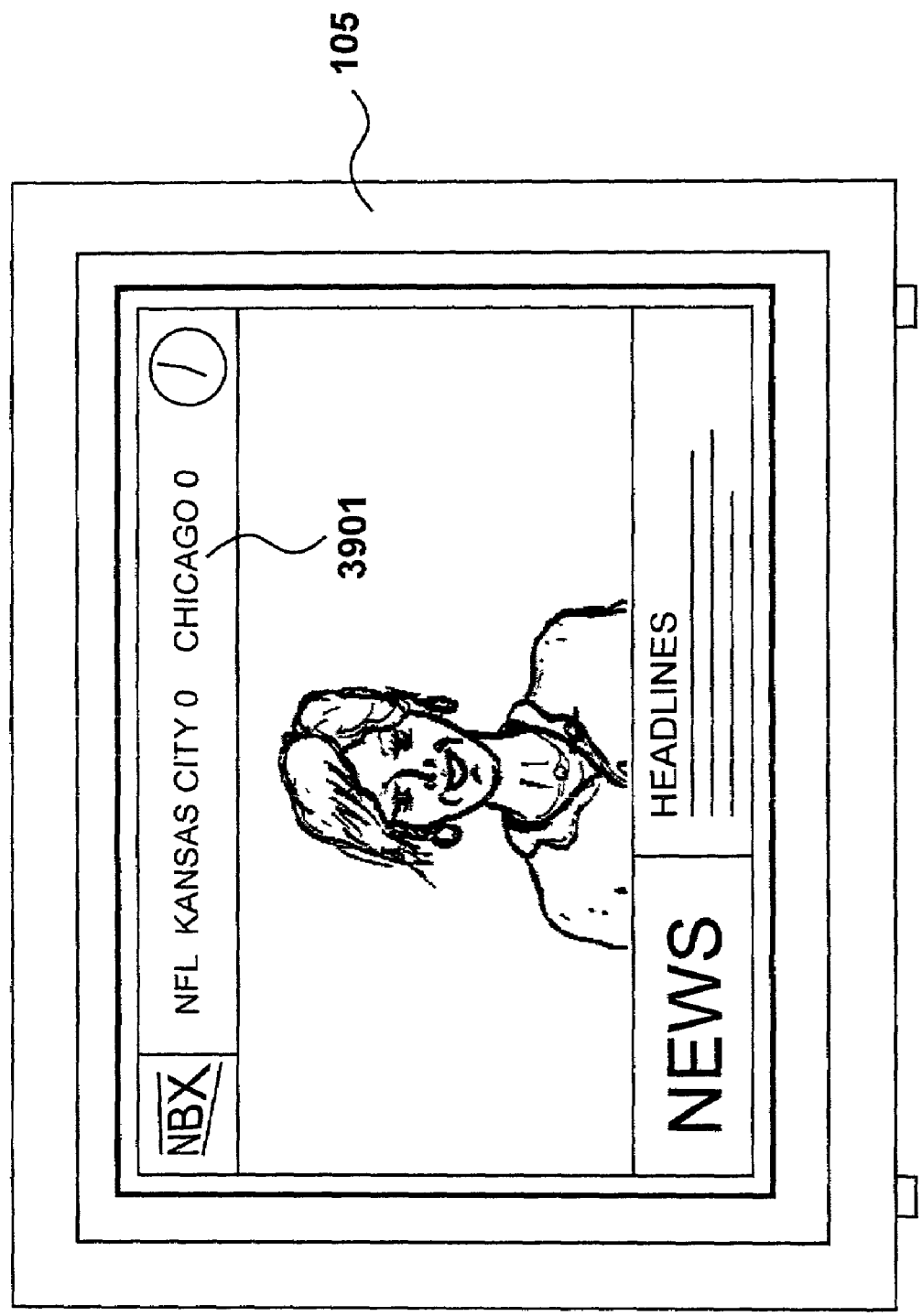
FIG. 39 shows a screenshot of an image as it would appears on the receiving apparatus shown in FIG. 34.

An image shown on the viewer's television set 105 is detailed in FIG. 39. At 3901 the viewer region of the animation contains viewer-specific animated objects. In this case these are two-dimensional text objects showing the score of a football match. However, the objects could be much more complex, including objects for a three-dimensional virtual world.

Figure 40:
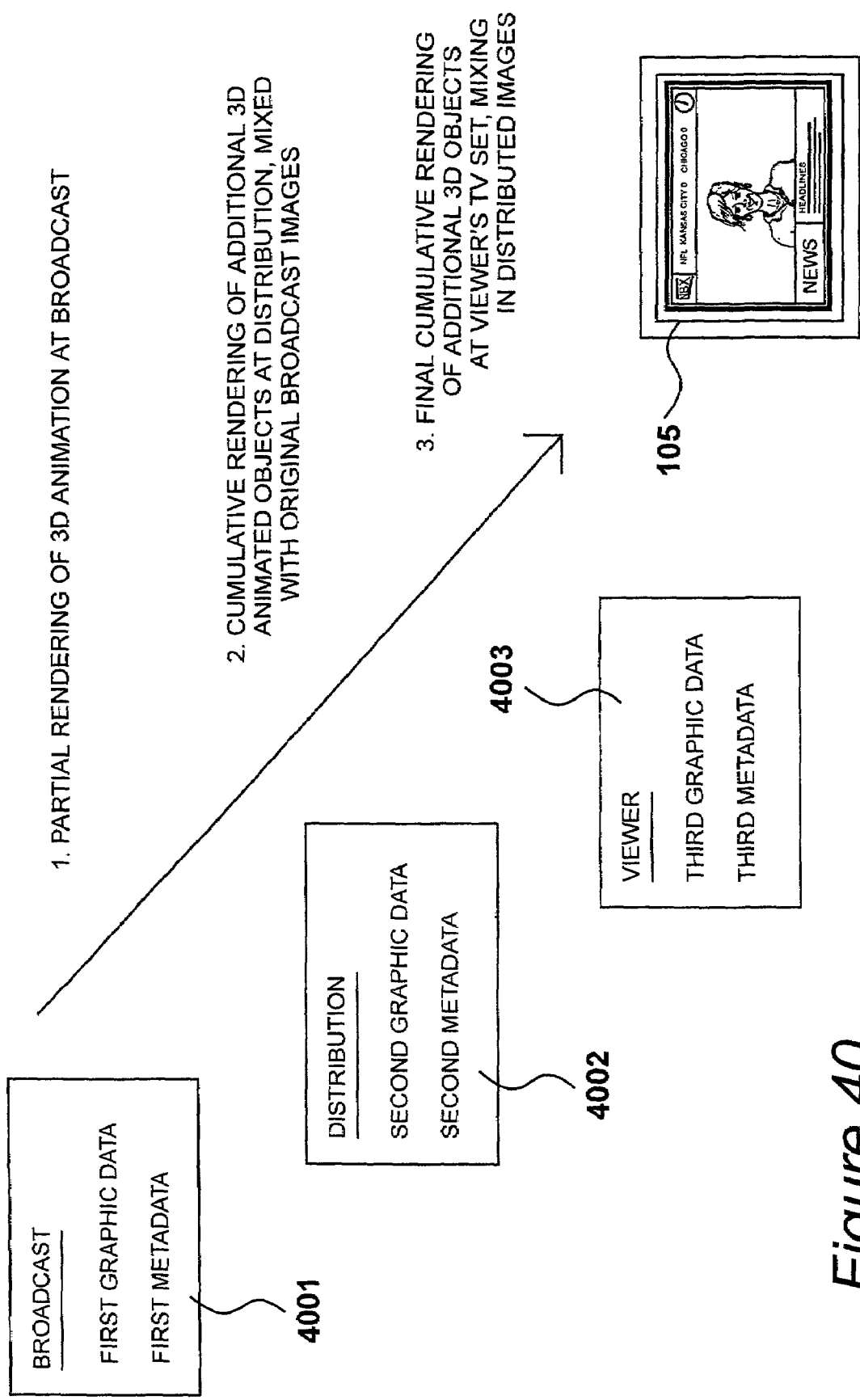
FIG. 40 illustrates operations of a preferred embodiment of the invention.

The embodiment provides a method of defining and rendering an animation in cumulative stages. This is summarised in FIG. 40. At a first stage 4001, a broadcaster 101 renders a complex set of animated objects from first graphic data 731 and first metadata 721. The graphic data is locked, but the broadcaster can easily make changes to the metadata 721 so as to enable swift and easy customisation of a graphic for use during a news broadcast. The broadcaster 101 generates a mix of animated and camera images, and transmits these as originating data in a broadcast signal.

At the second stage 4002, a distributor 103 cumulatively renders additional animated objects as part of the overall animation, and generates these from second graphic data 732 and second metadata 722. The graphic data 732 is locked, but the distributor can modify the metadata 722 prior to rendering and thereby customise the second rendered animated objects of the graphic. The result of this second stage is an intermediate image stream, called distributor data. Finally, at a third stage 4003, a viewer's receiving apparatus 105, cumulatively renders more animated objects as part of the overall animation. This part of the animation is defined by third graphic data 733 and third metadata 723, and results in the creation of viewer data. The viewer's receiving apparatus can modify the metadata 723 prior to rendering, and thereby customise the third rendered animated objects of the graphic.

At each of the three stages 4001, 4002, 4003, the graphic data may be encoded as part of a binary executable file, thus facilitating scrambling of valuable copyrighted animation objects, while still providing the facility for modifications to be made to the animation either automatically or interactively, using an XML-generated interface as shown in FIG. 14. Typically, distributor and viewer customisation will be automated. However, the use of the XML open standard ensures that any level of customisation, at any of the three stages, can be easily achieved, when this is required. The metadata, graphic data and executable graphic files can be created and or distributed independently from each other.

At each of the three stages 4001, 4002, 4003, the resulting images are considered as being defined by originating data, distribution data and viewer data, respectively.

What we claim is:

1. An image data distribution system comprising:
   (a) a first station comprising an animation designer that designs an animation, wherein the animation comprises:
      (i) first locked animated objects having first locked characteristics, wherein said locked characteristics comprise object primitives and geometrical attributes of the animation; and
      (ii) second modifiable animated objects separate to said first animated objects, wherein said second animated objects comprise second modifiable characteristics of the animation, and said second animated objects further comprise a broadcast part, a distribution part, and a viewer part, wherein each part is modified, after the animation has been designed, by a broadcaster station, a distributor station, and viewer station respectively;
   (b) a second station comprising:
      (i) receiving means arranged to receive said first locked animated objects and said second modifiable animated objects from said first station; and
      (ii) processing means arranged to modify said second modifiable characteristics based on the broadcast part if the second station comprises the broadcaster station, the distribution part if the second station comprises the distribution station, and the viewer part if the second station comprises the viewer station, wherein:
         (1) when said animation is displayed, said second animated objects display additional information in said animation;
         (2) the second station renders the first locked animated object and said second modifiable animated objects into an executable graphic file before passing the executable graphic file onto a subsequent station in a distribution chain.

2. An image data distribution system according to claim 1, wherein said second modifiable characteristics comprise metadata such that a user interface is defined facilitating editing of said second modifiable characteristics, wherein the metadata is transmitted asynchronously from the executable graphic file.

3. An image data distribution system according to claim 1, wherein:
   said broadcast part is only modifiable and accessible to a broadcaster station;
   said distribution part is only modifiable and accessible to a distributor station; and
   said viewer part is only modifiable and accessible to a viewer station.

4. An image data distribution system according to claim 3, wherein said broadcast part is scrambled to prevent access at the distributor station and viewer station.

5. An image data distribution system according to claim 1, wherein said system further comprises a plurality of display stations, and said second station comprises a transmission means for distributing image data, comprising said animation, to said display stations.

6. A system according to claim 1, wherein said animation is an interactive virtual world.

7. A method of defining an animation at a plurality of stations within an image data distribution system comprising the steps of:
   (a) at a first station, an animation designer designing the animation, wherein the animation comprises:
      (i) first locked animated objects having first locked characteristics, wherein said locked characteristics comprise object primitives and geometrical attributes of the animation; and
      (ii) second modifiable animated objects separate to said first animated objects, wherein said second animated objects comprise second modifiable characteristics of the animation, and said second animated objects further comprise a broadcast part, a distribution part, and a viewer part, wherein each part is modified, after the animation has been designed, by a broadcaster station, a distributor station, and viewer station respectively;
   (b) at a second station:
      (i) receiving said first locked animated objects and said second modifiable animated objects from said first station; and
      (ii) processing said second modifiable characteristics to modify said modifiable characteristics based on the broadcast part if the second station comprises the broadcaster station, the distribution part if the second station comprises the distribution station, and the viewer part if the second station comprises the viewer station, wherein:
         (1) when said animation is displayed, said second animated objects display additional information in said animation; and
         (2) the second station renders the first locked animated object and said second modifiable animated objects into an executable graphic file before passing the executable graphic file onto a subsequent station in a distribution chain.

8. A method of defining an animation according to claim 7, wherein said image data distribution system comprises a plurality of display stations, and said second station distributes image data, comprising said animation, to said display stations.

9. The method of claim 7, wherein said second modifiable characteristics comprise metadata such that a user interface is defined facilitating editing of said second modifiable characteristics, wherein the metadata is transmitted asynchronously from the executable graphic file.

10. An article of manufacture comprising a program storage medium readable by a computer and embodying one or more instructions executable by the computer to perform a method for defining an animation and a plurality of stations within an image data distribution system, the method comprising:

(a) at a first station, an animation designer designing the animation, wherein the animation comprises:
  (i) first locked animated objects having first locked characteristics, wherein said locked characteristics comprise object primitives and geometrical attributes of the animation; and
  (ii) second modifiable animated objects separate to said first animated objects, wherein said second animated objects comprise second modifiable characteristics of the animation, and said second animated objects further comprise a broadcast part, a distribution part, and a viewer part, wherein each part is modified, after the animation has been designed, by a broadcaster station, a distributor station, and viewer station respectively;
(b) at a second station:
  (i) receiving said first locked animated objects and said second modifiable animated objects from said first station; and
  (ii) processing said second modifiable characteristics to modify said modifiable characteristics based on the broadcast part if the second station comprises the broadcaster station, the distribution part if the second station comprises the distribution station, and the viewer part if the second station comprises the viewer station, wherein:
    (1) when said animation is displayed, said second animated objects display additional information in said animation; and
    (2) the second station renders the first locked animated object and said second modifiable animated objects into an executable graphic file before passing the executable graphic file onto a subsequent station in a distribution chain.

11. The article of manufacture of claim 10, wherein said second modifiable characteristics comprise metadata such that a user interface is defined facilitating editing of said second modifiable characteristics, wherein the metadata is transmitted asynchronously from the executable graphic file.

* * * * *